US011878306B2

(12) United States Patent
Yamada et al.

(10) Patent No.: US 11,878,306 B2
(45) Date of Patent: Jan. 23, 2024

(54) COARSE CRUSHER

(71) Applicant: SEIKO EPSON CORPORATION, Tokyo (JP)

(72) Inventors: Kentaro Yamada, Nagano (JP); Yuki Kodama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 237 days.

(21) Appl. No.: 17/511,621

(22) Filed: Oct. 27, 2021

(65) Prior Publication Data

US 2022/0134348 A1 May 5, 2022

(30) Foreign Application Priority Data

Oct. 29, 2020 (JP) ................................. 2020-181599

(51) Int. Cl.
*B02C 18/18* (2006.01)
*B02C 18/14* (2006.01)
*B02C 18/00* (2006.01)
*B02C 18/22* (2006.01)

(52) U.S. Cl.
CPC ........ *B02C 18/145* (2013.01); *B02C 18/0007* (2013.01); *B02C 18/18* (2013.01); *B02C 18/2291* (2013.01)

(58) Field of Classification Search
CPC ... B02C 18/2291; B02C 18/18; B02C 18/145; B02C 18/142; B02C 18/0007
See application file for complete search history.

(56) References Cited

U.S. PATENT DOCUMENTS 3,687,062 A * 8/1972 Frank ........................ B02C 4/08 100/902
4,351,485 A * 9/1982 Hardwick ............... B02C 18/16 241/285.3
4,564,146 A * 1/1986 Bleasdale ........... B02C 18/2291 241/37.5
4,844,363 A * 7/1989 Garnier ............... B02C 18/2233 241/35
5,085,375 A * 2/1992 Haworth ................. B02C 18/12 241/55

(Continued)

FOREIGN PATENT DOCUMENTS

DE 4226182 * 2/1994 ............... B02C 4/32
JP 2003-251209 A 9/2003
JP 2020-104236 A 7/2020

*Primary Examiner* — Faye Francis
(74) *Attorney, Agent, or Firm* — Global IP Counselors, LLP

(57) ABSTRACT

A coarse crusher includes a coarsely crushing unit configured to coarsely crush a sheet piece having an elongated shape, a hopper configured to feed the sheet piece to the coarsely crushing unit through a feed opening, and a posture adjuster configured to adjust posture of the sheet piece. The hopper includes two guide plates facing each other with the feed opening therebetween and configured to guide the sheet piece to the coarsely crushing unit and two coupling plates coupling the two guide plates. The posture adjuster includes a protrusion disposed on at least one of the coupling plates and protruding toward an inner side of the hopper. The posture adjuster is configured to come in contact with the sheet piece being coarsely crushed to adjust the posture of a portion of the sheet piece that is remote from the coarsely crushing unit.

10 Claims, 14 Drawing Sheets

(56) References Cited

U.S. PATENT DOCUMENTS

| | | | | | |
|---|---|---|---|---|---|
| 5,096,131 | A * | 3/1992 | Patzelt | B02C 4/286 | 241/224 |
| 5,248,100 | A * | 9/1993 | Arakawa | B02C 18/142 | 241/34 |
| 5,417,374 | A * | 5/1995 | Kranz | B02C 4/286 | 241/224 |
| 5,657,933 | A * | 8/1997 | Williams | B02C 18/2291 | 241/189.1 |
| 7,325,762 | B2 * | 2/2008 | Marbourg | B02C 18/0007 | 241/285.3 |
| 7,712,688 | B2 * | 5/2010 | Priester | B02C 18/2291 | 241/37.5 |
| 2005/0001081 | A1 * | 1/2005 | Maier | B02C 18/2291 | 241/236 |
| 2008/0169370 | A1 * | 7/2008 | Aries | B02C 18/0007 | 241/37.5 |
| 2020/0208348 | A1 | 7/2020 | Yamada | | |

* cited by examiner

COARSE CRUSHER

The present application is based on, and claims priority from JP Application Serial Number 2020-181599, filed Oct. 29, 2020, the disclosure of which is hereby incorporated by reference herein in its entirety.

BACKGROUND

1. Technical Field

The present disclosure relates to a coarse crusher.

2. Related Art

A dry sheet manufacturing apparatus that uses as little water as possible has been proposed recently. For example, one known sheet manufacturing apparatus includes a coarsely crushing unit that coarsely crushes a material containing fibers, a defibrator that defibrates the coarsely crushed pieces produced by the coarsely crushing unit, an accumulation unit on which the defibrated substances produced by the defibrator are accumulated, and a forming unit that forms the substances accumulated on the accumulation unit into a certain shape.

An example of the coarsely crushing unit is a shredder described in JP-A-2003-251209. The shredder in JP-A-2003-251209 includes a hopper that receives a sheet and a cutter unit that coarsely crushes the sheet fed from the hopper. The cutter unit includes a pair of rotary blades.

However, the sheet may be in an undesirable posture during coarse crushing depending on the shape of the sheet. In such a case, the sheet is not sufficiently coarsely crushed, deteriorating quantitative properties in the sheet manufacturing.

SUMMARY

A coarse crusher according to an aspect of the present disclosure includes a coarsely crushing unit configured to coarsely crush a sheet piece having an elongated shape, a hopper having a feed opening through which the sheet piece is fed to the coarsely crushing unit, the hopper being configured to feed the sheet piece putted into the hopper to the coarsely crushing unit through the feed opening, and a posture adjuster configured to adjust posture of the sheet piece. The hopper includes two guide plates facing each other with the feed opening therebetween and configured to guide the sheet piece to the coarsely crushing unit and two coupling plates coupling the two guide plates to each other. The posture adjuster includes a protrusion disposed on at least one of the coupling plates and protruding toward an inner side of the hopper. The posture adjuster is configured to come in contact with the sheet piece being coarsely crushed by the coarsely crushing unit to adjust the posture of a portion of the sheet piece that is remote from the coarsely crushing unit.

DESCRIPTION OF EXEMPLARY EMBODIMENTS

Hereinafter, a coarse crusher according to an aspect of the present disclosure will be described in detail with reference to embodiments illustrated in the attached drawings.

First Embodiment

Figure 1:
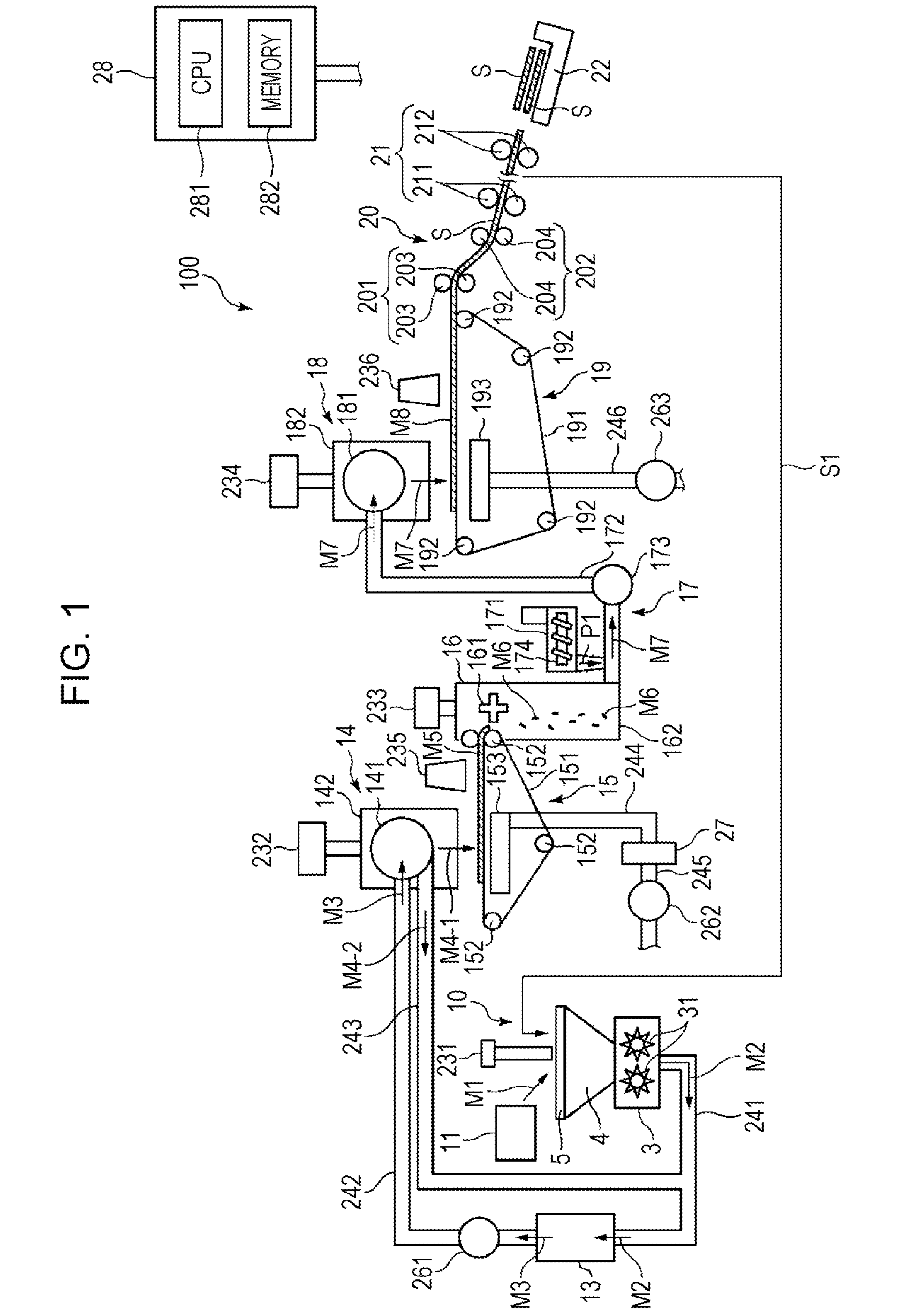
FIG. 1 is a side view schematically illustrating a fiber structure manufacturing apparatus including a coarse crusher according to a first embodiment.
Figure 2:
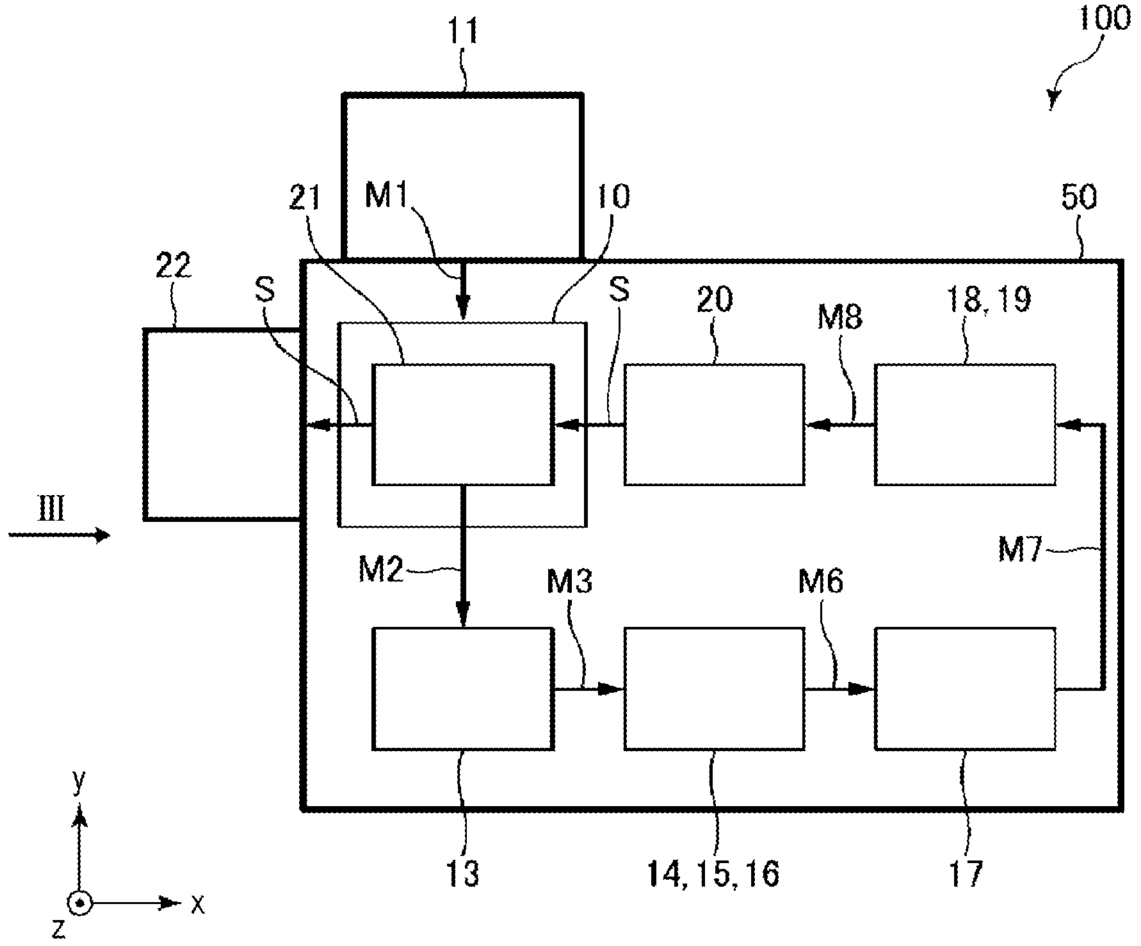
FIG. 2 is a schematic view illustrating a positional relationship between components of the fiber structure manufacturing apparatus illustrated in FIG. 1 and viewed from above in the vertical direction.
Figure 3:
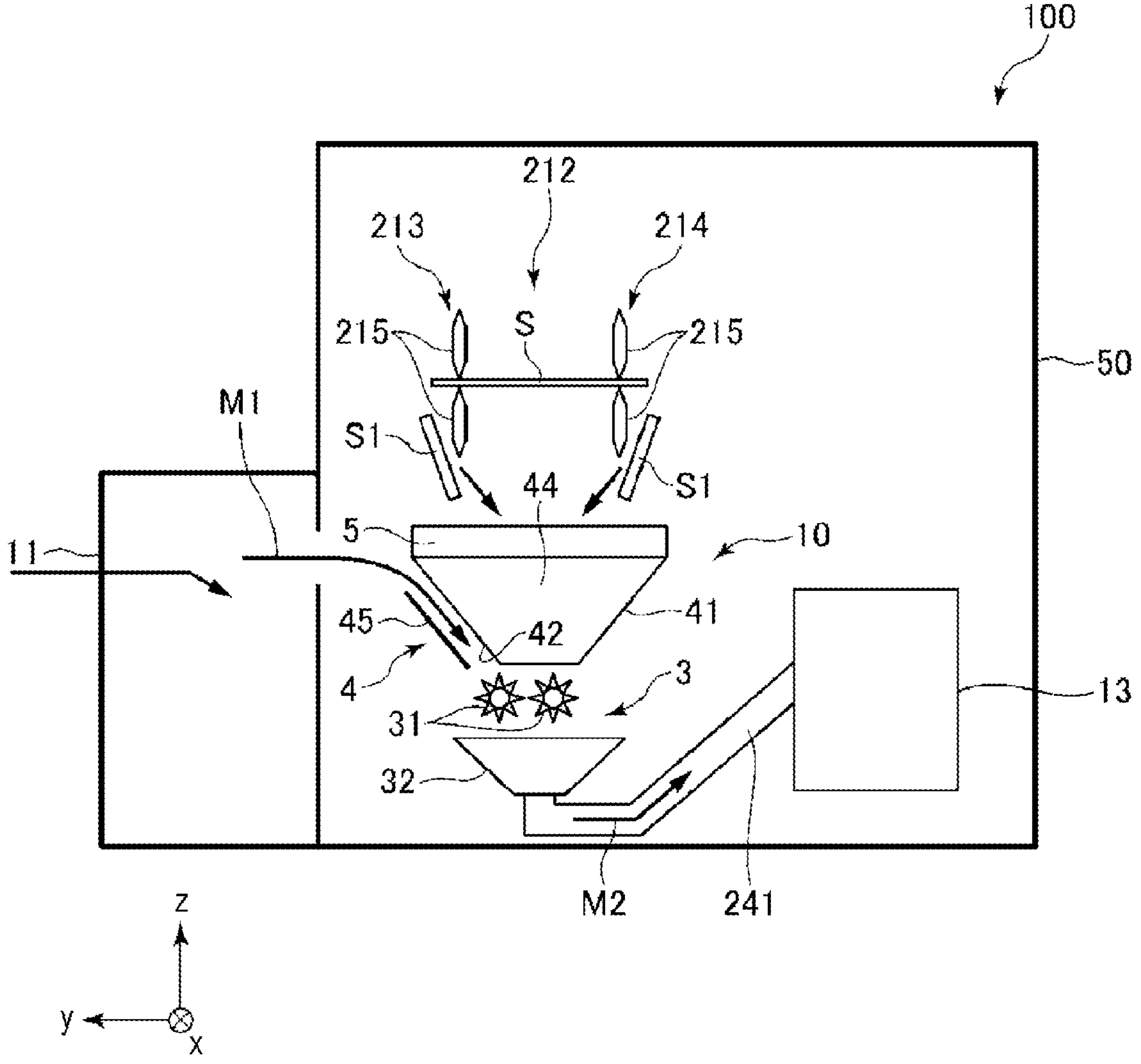
FIG. 3 is a schematic view illustrating a positional relationship between components of the fiber structure manufacturing apparatus illustrated in FIG. 1 and viewed in a direction indicated by an arrow III in FIG. 2.
Figure 4:
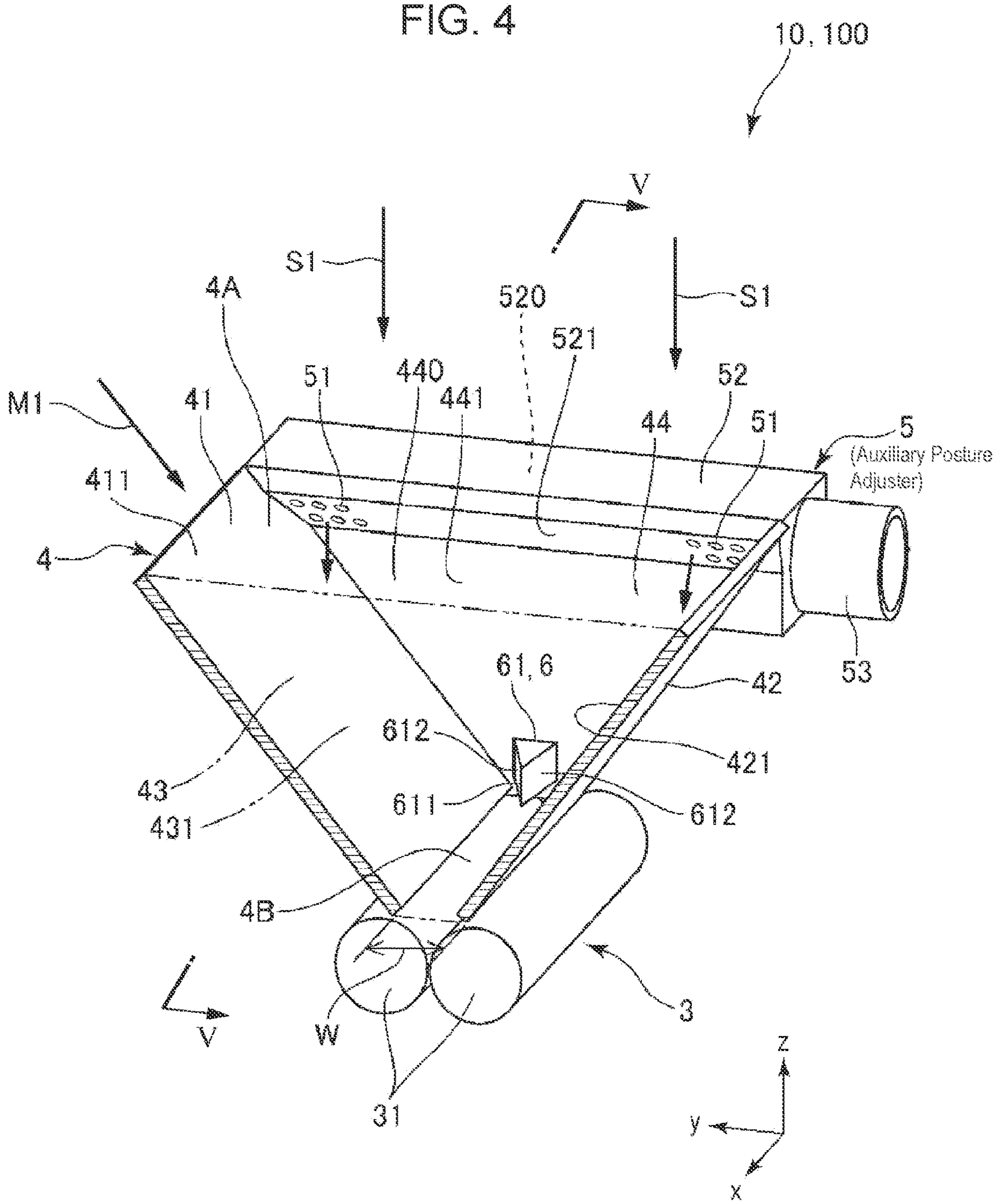
FIG. 4 is a perspective view of the coarse crusher illustrated in FIG. 1.
Figure 5:
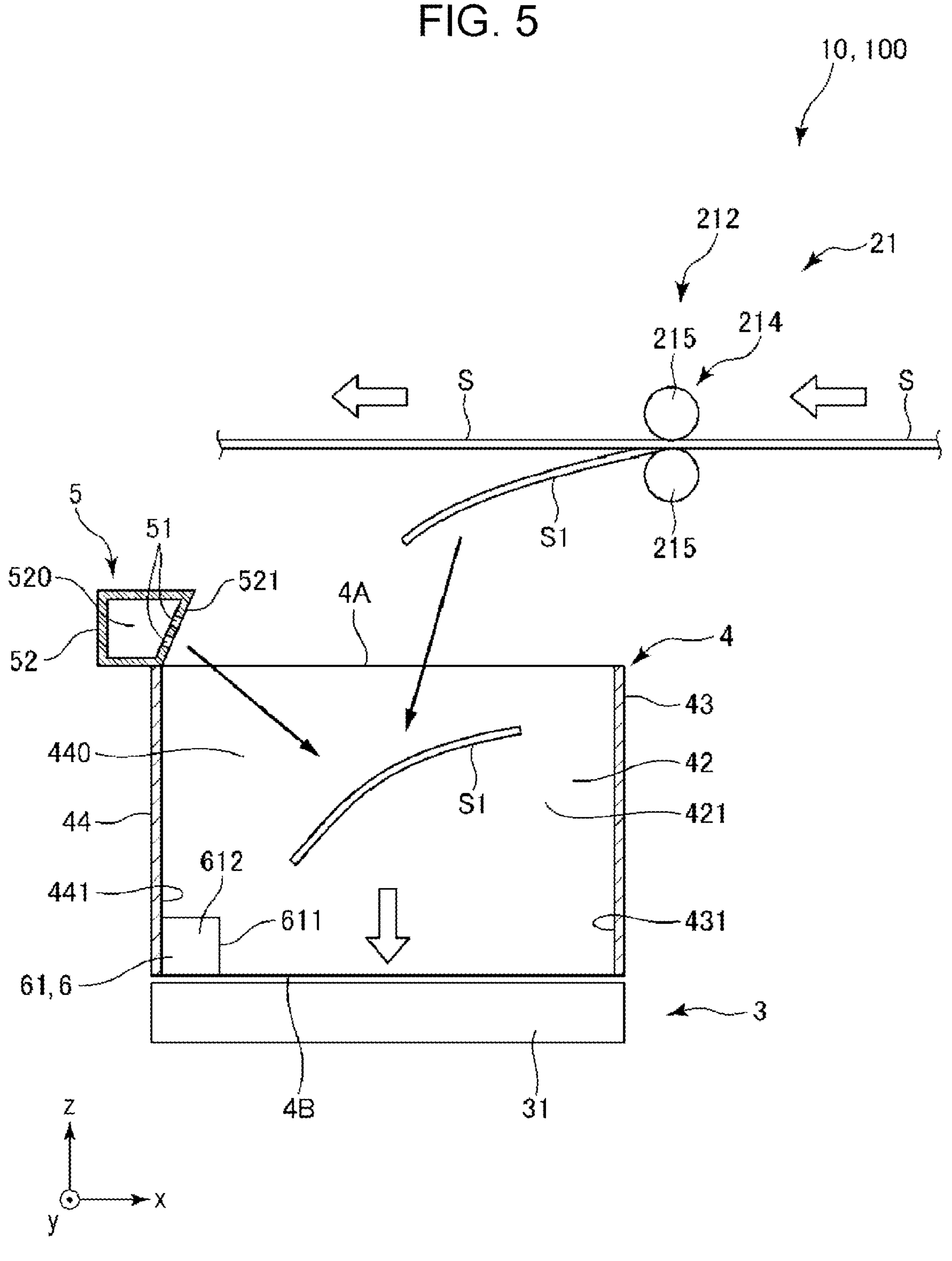
FIG. 5 is a cross-sectional view taken along arrowed line V-V in FIG. 4.
Figure 6:
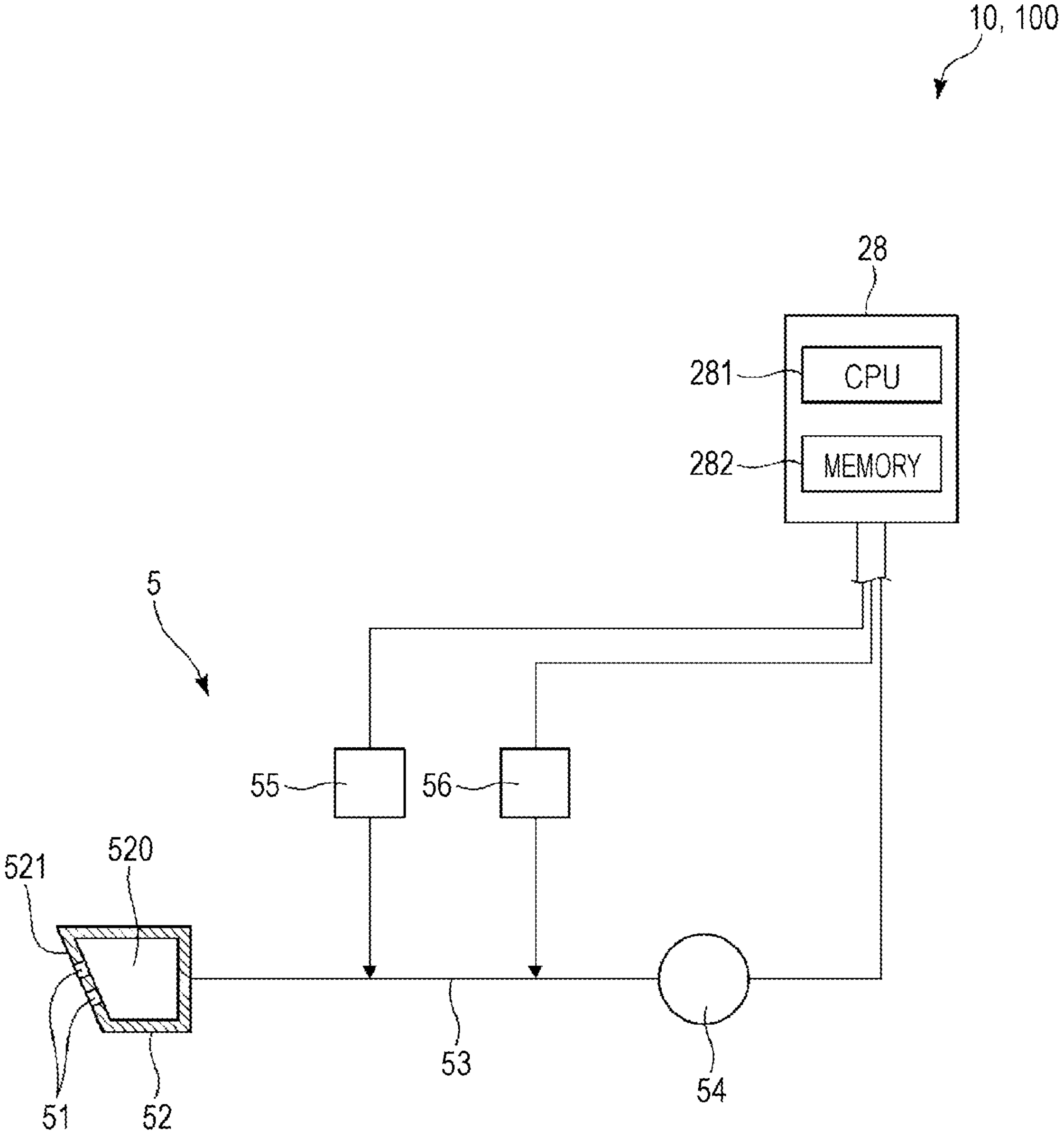
FIG. 6 is a configuration diagram schematically illustrating the coarse crusher illustrated in FIG. 1.
Figure 7:
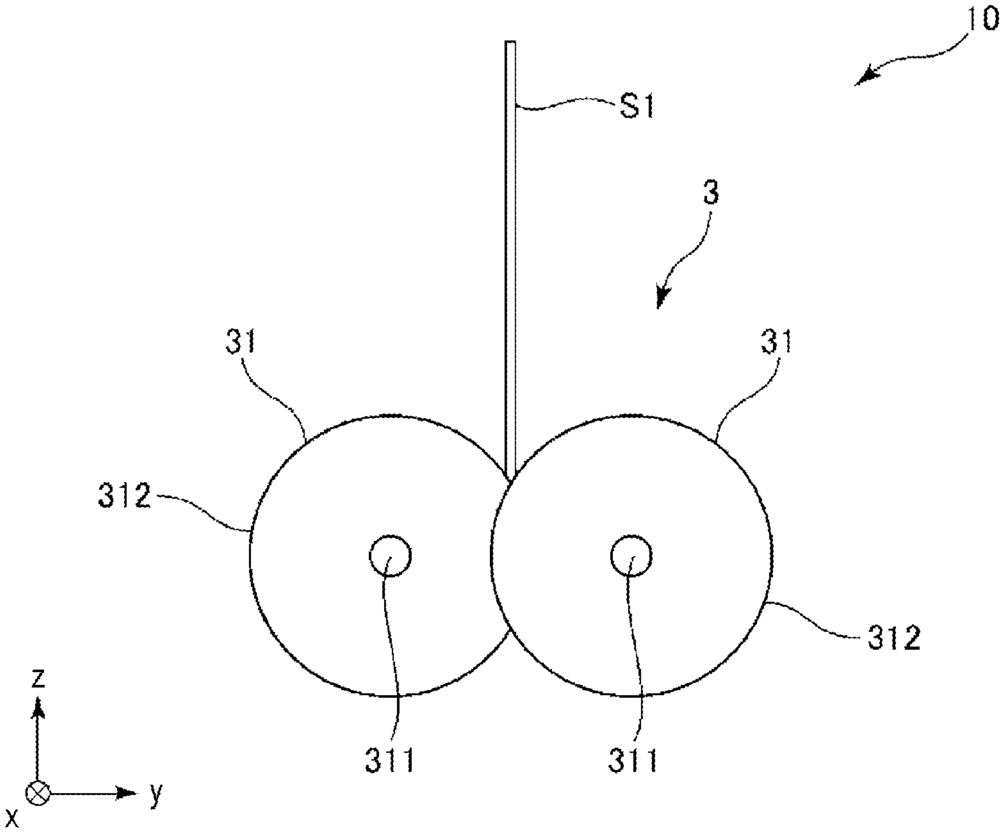
FIG. 7 is a view of a sheet piece that is being properly and coarsely crushed by a coarsely crushing unit.
Figure 8:
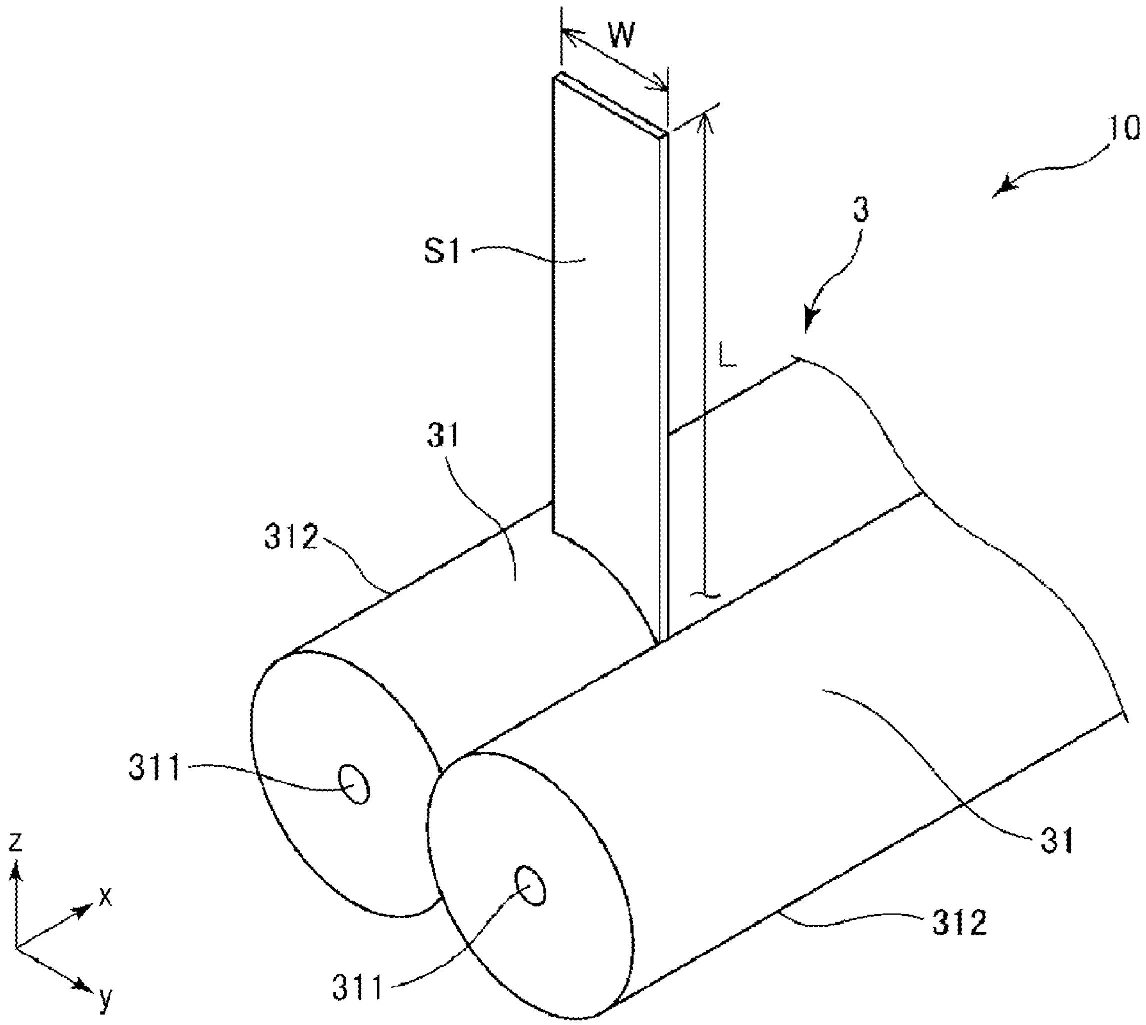
FIG. 8 is a view of a sheet piece being in an undesirable posture and being coarsely crushed by the coarsely crushing unit.
Figure 9:
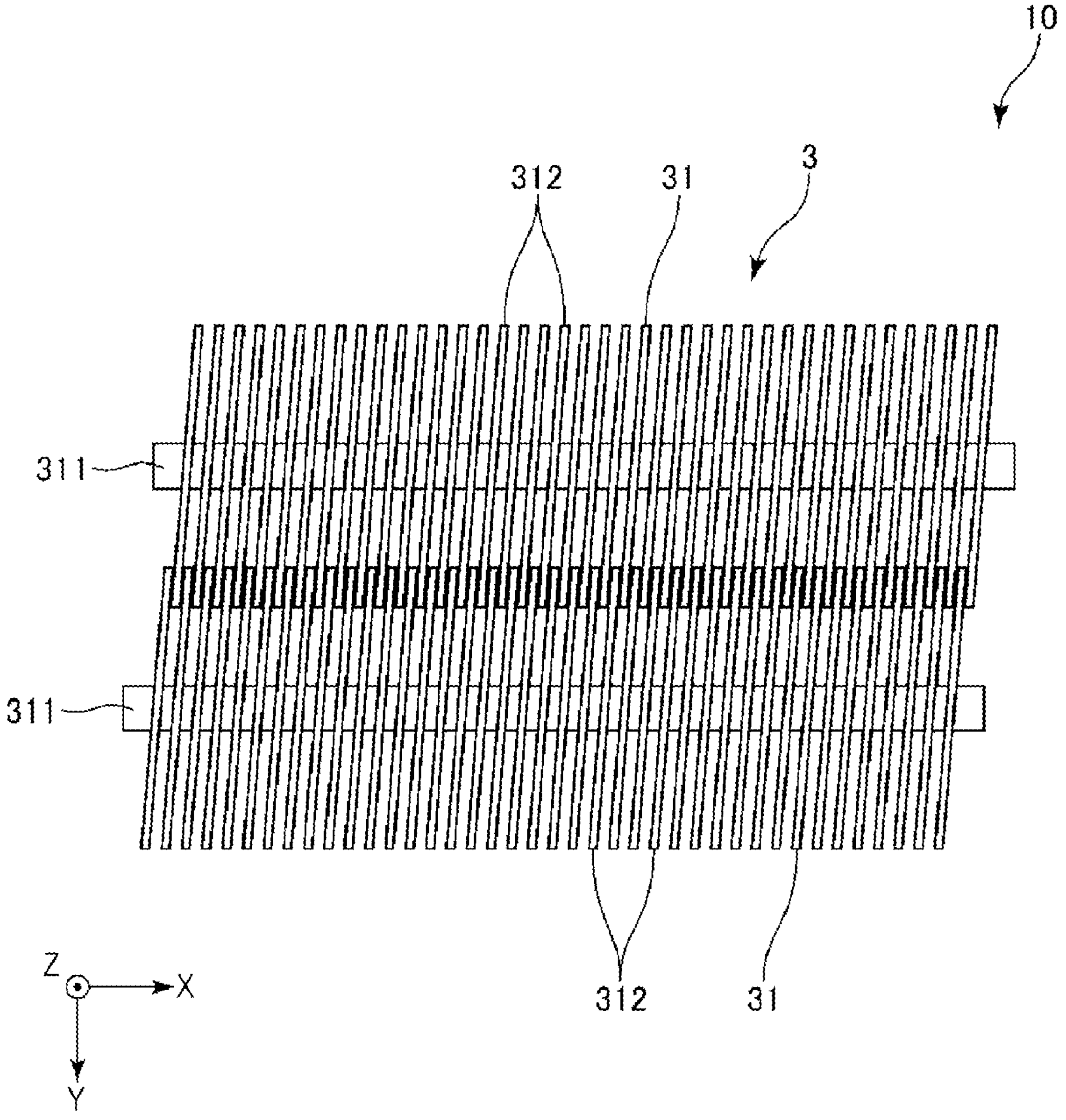
FIG. 9 is a top view of coarsely crushing blades.
Figure 10:
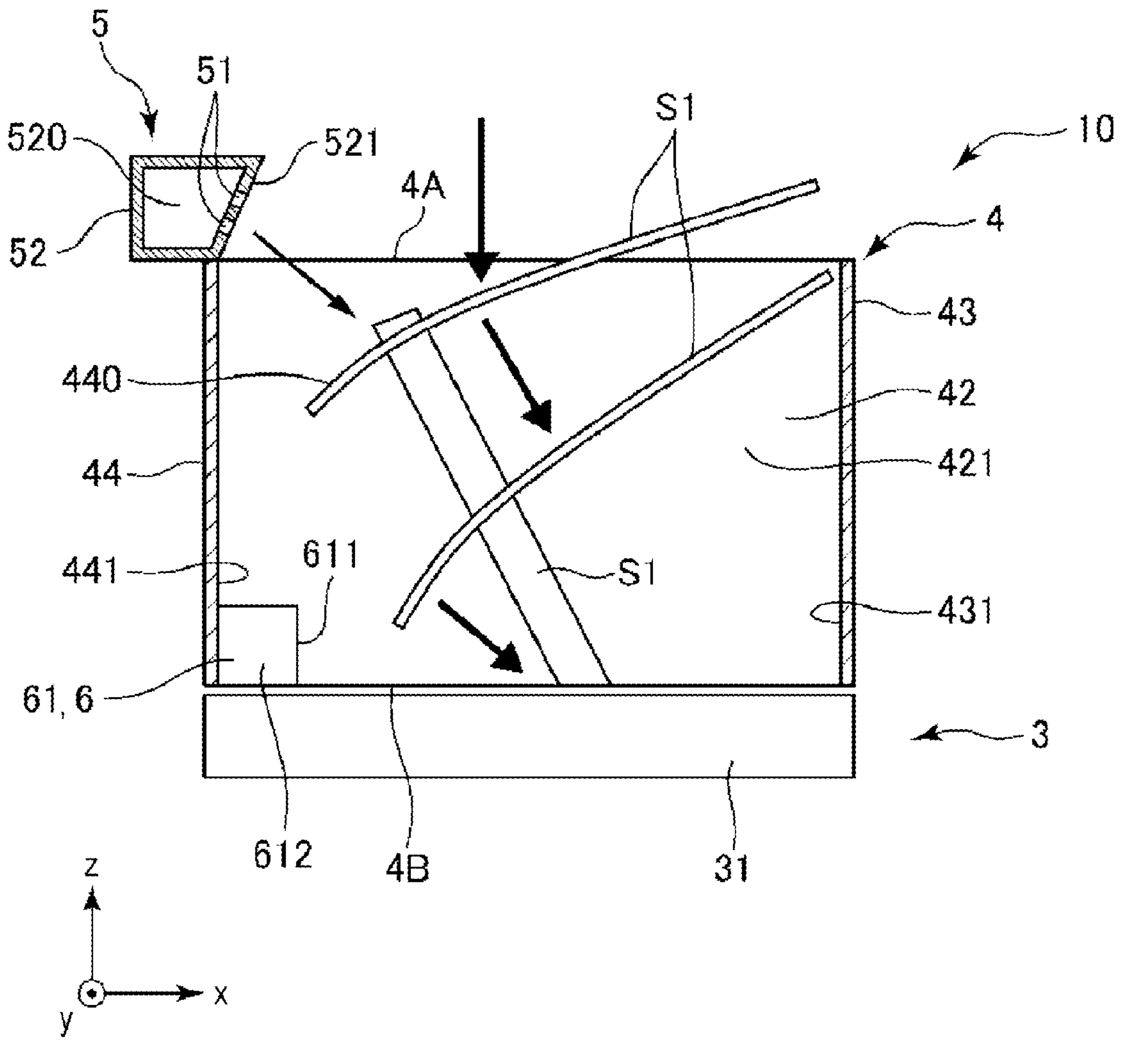
FIG. 10 is a view of a hopper into which a sheet piece is fed.
Figure 11:
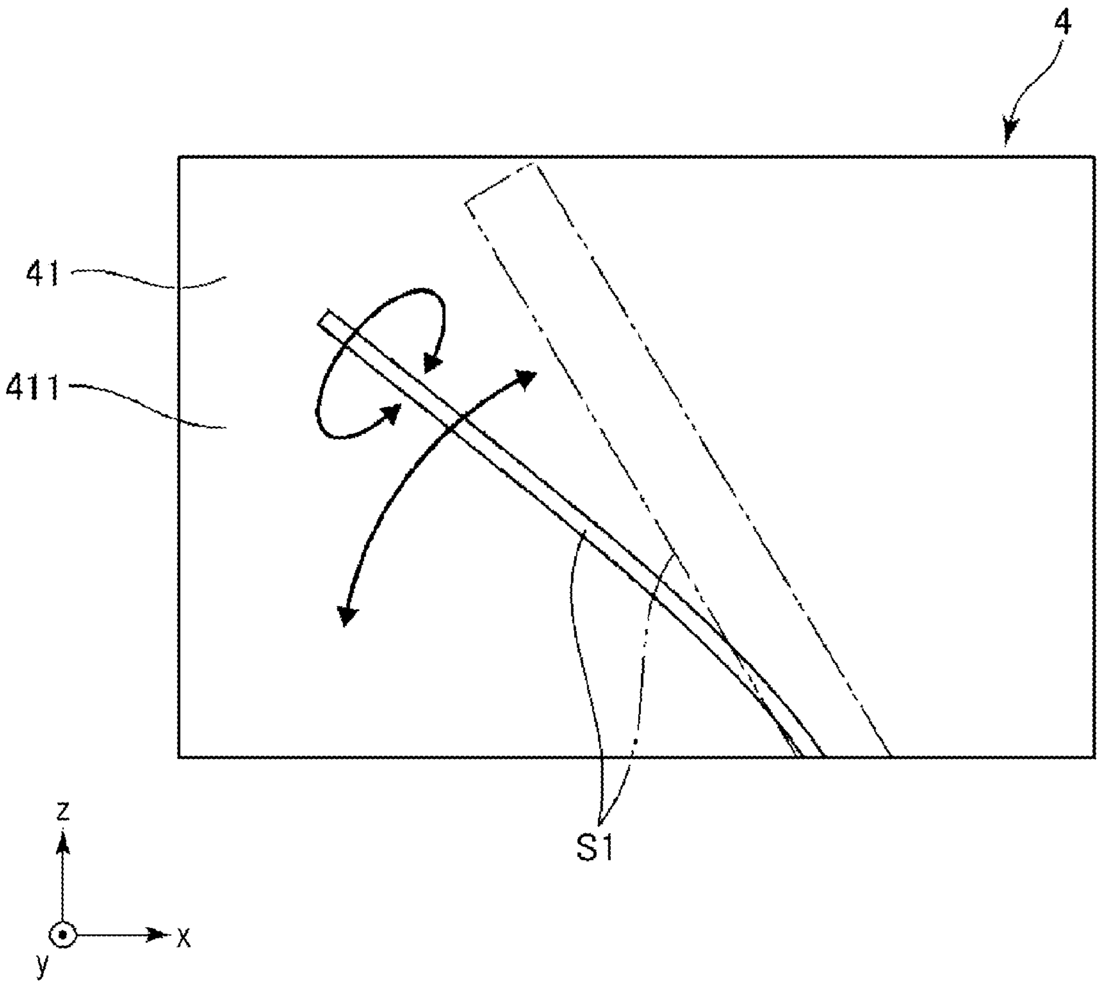
FIG. 11 is a view indicating a change in the posture of a sheet piece being coarsely crushed.
Figure 12:
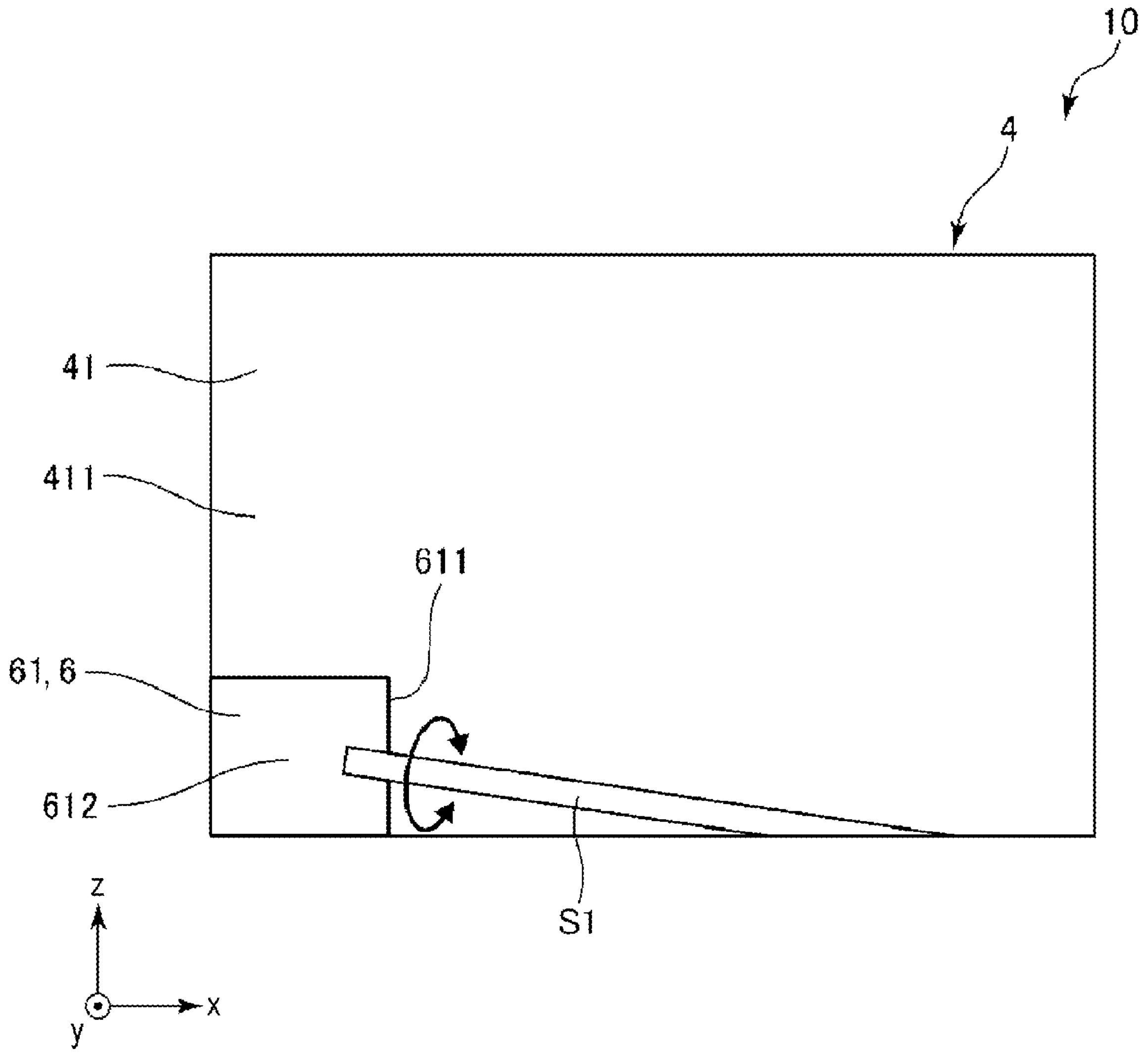
FIG. 12 is a view indicating posture adjustment of the sheet piece by a posture adjuster.

FIG. 1 is a side view schematically illustrating a fiber structure manufacturing apparatus including a coarse crusher according to a first embodiment. FIG. 2 is a schematic view illustrating a positional relationship between components of the fiber structure manufacturing apparatus illustrated in FIG. 1 and viewed from above in the vertical direction. FIG. 3 is a schematic view illustrating the positional relationship between the components of the fiber structure manufacturing apparatus illustrated in FIG. 1 and viewed in a direction indicated by an arrow III in FIG. 2. FIG. 4 is a perspective view of the coarse crusher in FIG. 1. FIG. 5 is a cross-sectional view taken along arrowed line V-V in FIG. 4. FIG. 6 is a configuration diagram schematically illustrating the coarse crusher in FIG. 1. FIG. 7 is a view of a sheet piece that is being properly coarsely crushed by a coarsely crushing unit. FIG. 8 is a view of a sheet piece that is being in an undesirable posture and being coarsely crushed by the coarsely crushing unit. FIG. 9 is a top view of coarsely crushing blades. FIG. 10 is a view of a hopper into which a sheet piece is fed. FIG. 11 is a view indicating a change in the posture of the sheet piece being coarsely crushed. FIG. 12 is a view indicting posture adjustment of the sheet piece by a posture adjuster.

In the following description, as illustrated in FIGS. 2 to 5 and FIGS. 7 to 14, three axes perpendicular to each other are defined as x, y, and z axes for illustrative purposes. An x-y plane parallel to the x and y axes extends horizontally. The z axis extends vertically. The directions pointed by the arrows of the axes are prefixed with "+" and the opposite directions are prefixed with "−". The upper side in FIGS. 1, 3 to 5, 7 8, and 10 to 14 is referred to as "up" or "upward"

and the lower side in these figures is referred to as "down" or "downward" in some cases.

FIG. 1 is a schematic configuration diagram. The positional relationship between the components of the actual fiber structure manufacturing apparatus 100 is greatly different from that in FIG. 1. A transportation direction in the drawings is a direction in which a raw material M1, a coarsely crushed piece M2, a defibrated substance M3, a first sorted substance M4-1, a second sorted substance M4-2, a first web M5, a fractionized substance M6, a mixture M7, a second web M8, a sheet S, and a sheet piece S1 are transported, or a direction indicated by arrows. A side indicated by the heads of the arrows is referred to as "downstream" in the transportation direction and a side indicated by the tails of the arrows is referred to as "upstream" in the transportation direction.

As illustrated in FIG. 1, the fiber structure manufacturing apparatus 100 coarsely crushes and defibrates the raw material M1 and the sheet piece S1, which will be described later, mixes a bonding material into the fibers and accumulates the mixture, and forms the accumulated mixture into a certain shape by using the forming unit 20 to obtain a formed article.

The formed article manufactured by the fiber structure manufacturing apparatus 100 may be one having a sheet-like shape such as recycled paper or one having a block-like shape. The formed article may have any density. The formed article may be one having a relatively high fiber density, such as a sheet, or may be one having a relatively low fiber density, such as a sponge, or may be one having characteristics of both of the articles.

In the following description, the raw material M1 is waste paper, which has been used or unwanted, and the formed article to be manufactured is recycled paper in the form of a sheet S.

The fiber structure manufacturing apparatus 100 illustrated in FIG. 1 includes a material feeder 11, a coarse crusher 10 according to the present disclosure, a defibrator 13, a sorter 14, a first web forming unit 15, a comminutor 16, a mixer 17, a disperser 18, a second web forming unit 19, which is an accumulation unit, a forming unit 20, a cutting unit 21, a storage 22, a collection portion 27, and a controller 28, which controls these components.

The fiber structure manufacturing apparatus 100 further includes humidifiers 231, 232, 233, 234, 235, and 236. In addition, the fiber structure manufacturing apparatus 100 includes blowers 261, 262, and 263.

The fiber structure manufacturing apparatus 100 performs, in this order, a material feeding step, a coarsely crushing step, a defibrating step, a sorting step, a first web forming step, a fractionizing step, a mixing step, an untangling step, a second web forming step, a sheet forming step, and a cutting step.

Hereinafter, the configurations of the components are described. The material feeder 11 performs the material feeding step of feeding the raw material M1 to the coarse crusher 10. The raw material M1 is a sheet-like material formed of a fiber-containing material containing a cellulose fiber. The cellulose fiber may be any fibrous material containing mainly cellulose as a compound. The cellulose fiber may contain hemicellulose or lignin in addition to the cellulose. The raw material M1 may be in any form, such as a woven cloth and a non-woven cloth. The raw material M1 may be recycled paper produced by defibrating and regenerating waste paper or may be a synthetic paper YUPO (registered trademark) or may be paper other than the recycled paper. In this embodiment, the raw material M1 is waste paper that has been used or unwanted.

The coarse crusher 10 performs the coarsely crushing step of coarsely crushing the raw material M1 fed by the material feeder 11 and a cut waste produced by the cutting unit 21, which will be described later, in air such as ambient air to produce the coarsely crushed pieces M2. The configuration of the coarse crusher 10 will be described in detail later. The coarsely crushed pieces M2 produced by the coarse crusher 10 are transported through a tube 241 to the defibrator 13.

The defibrator 13 performs the defibrating step of dry-defibrating the coarsely crushed piece M2 in air. In the defibrator 13, the coarsely crushed piece M2 is defibrated to be the defibrated substances M3. Here, the term "defibrating" means separating the coarsely crushed piece M2, which is composed of multiple fibers bonded together, into individual fibers. The separated fibers are the defibrated substances M3. The defibrated substance M3 has a linear shape or a band-like shape. The defibrated substances M3 may be tangled into a small mass or may have a "lump".

In this embodiment, the defibrator 13 includes, for example, a rotary blade that rotates at high speed and an impeller mill having a liner located outward from the rotary blade. The coarsely crushed piece M2 that has flowed into the defibrator 13 is defibrated while being sandwiched between the rotary blade and the liner.

The defibrator 13 creates a current of air or air stream flowing from the coarse crusher 10 toward the sorter 14 by rotation of the rotary blade. This enables the coarsely crushed piece M2 in the tube 241 to be suctioned into the defibrator 13. Furthermore, this enables, after the defibration, the defibrated substance M3 to be sent to the sorter 14 through a tube 242.

The blower 261 is disposed on the tube 242. The blower 261 is an air stream generator that generates air stream flowing toward the sorter 14. The blower 261 accelerates the transportation of the defibrated substance M3 toward the sorter 14.

The sorter 14 performs the sorting step of sorting the defibrated substances M3 according to the fiber length. In the sorter 14, the defibrated substances M3 are sorted into first sorted substances M4-1 and second sorted substances M4-2 larger than the first sorted substances M4-1. The first sorted substance M4-1 has a size suitable for a subsequent step of producing the sheet S. The average length of the first sorted substances M4-1 is preferably not less than 1 μm and not more than 30 μm. The second sorted substance M4-2 includes, for example, insufficiently defibrated fibers and too much coagulated defibrated fibers.

The sorter 14 includes a drum 141 and a housing 142 housing the drum 141.

The drum 141 has a meshed cylindrical body and is a sieve that rotates about the central axis thereof. The defibrated substance M3 flows into the drum 141. When the drum 141 is rotated, the defibrated substance M3 smaller than the sieve opening is sorted as the first sorted substance M4-1 and the defibrated substance M3 larger than the sieve opening is sorted as the second sorted substance M4-2. The first sorted substance M4-1 falls from the drum 141.

The second sorted substance M4-2 is sent to a tube 243 coupled to the drum 141. The tube 243 is coupled to the tube 241 at the downstream end remote from the drum 141. The second sorted substance M4-2 passes through the tube 243 to join the coarsely crushed piece M2 in the tube 241 and flows into the defibrator 13 together with the coarsely crushed piece M2. In this way, the second sorted substance M4-2 returns to the defibrator 13 to be defibrated together with the coarsely crushed piece M2.

The first sorted substances M4-1 falls from the drum 141 toward the first web forming unit 15 located below the drum 141 while being dispersed in the air. The first web forming unit 15 performs the first web forming step of forming the first web M5 from the first sorted substances M4-1. The first web forming unit 15 includes a mesh belt 151, three tension rollers 152, and a suctioning portion 153.

The mesh belt 151 is an endless belt on which the first sorted substance M4-1 is accumulated. The mesh belt 151 is wound on the three tension rollers 152. When the tension rollers 152 are rotated, the first sorted substance M4-1 on the mesh belt 151 is transported downstream.

The first sorted substance M4-1 is larger than the mesh openings of the mesh belt 151. Thus, the first sorted substance M4-1 does not pass through the mesh belt 151 and accumulates on the mesh belt 151. The first sorted substance M4-1 being accumulated on the mesh belt 151 is transported downstream together with the mesh belt 151 and thus a layered first web M5 is formed.

In some cases, the first sorted substance M4-1 contains grit and dust, for example. The grit and dust may be generated in the coarse crushing and the defibrating, for example. The grit and dust are collected in the collection portion 27, which will be described later.

The suctioning portion 153 is a suction system for suctioning air from below the mesh belt 151. Thus, grit and dust that have been passed through the mesh belt 151 are suctioned together with air.

The suctioning portion 153 is coupled to the collection portion 27 through a tube 244. The grit and dust suctioned by the suctioning portion 153 is collected in the collection portion 27.

A tube 245 is further coupled to the collection portion 27. Furthermore, a blower 262 is disposed on the tube 245. When the blower 262 is operated, a suctioning force is generated at the suctioning portion 153. This accelerates formation of the first web M5 on the mesh belt 151. The first web M5 does not contain grit and dust. When the blower 262 is operated, the grit and dust pass through the tube 244 to the collection portion 27.

The housing 142 is coupled to the humidifier 232. The humidifier 232 is a vapor humidifier. The humidified air is supplied into the housing 142. The humidified air humidifies the first sorted substance M4-1, reducing the possibility that the first sorted substance M4-1 will be attached to the inner wall of the housing 142 by an electrostatic force.

The humidifier 235 is disposed downstream of the sorter 14. The humidifier 235 is an ultrasonic humidifier that sprays water. The moisture is supplied to the first web M5, and thus the moisture content of the first web M5 is adjusted. This adjustment reduces the possibility that the first web M5 will be attracted by an electrostatic force to the mesh belt 151. Thus, the first web M5 is readily detached from the mesh belt 151 at the tension roller 152 where the mesh belt 151 is turned.

The comminutor 16 is disposed downstream of the humidifier 235. The comminutor 16 performs the fractionizing step of fractionizing the first web M5 detached from the mesh belt 151. The comminutor 16 includes a rotatably supported propeller 161 and a housing 162 housing the propeller 161. The rotating propeller 161 fractionizes the first web M5. The first web M5 is fractionized to be fractionized substance M6. The fractionized substance M6 falls in the housing 162.

The housing 162 is coupled to the humidifier 233. The humidifier 233 is a vapor humidifier as the humidifier 231. Thus, humidified air is supplied into the housing 162. The humidified air reduces the possibility that the fractionized substance M6 will be attached to the propeller 161 and the inner wall of the housing 162 by an electrostatic force.

The mixer 17 is disposed downstream of the comminutor 16. The mixer 17 performs the mixing step of mixing the fractionized substance M6 and an adhesive P1. The mixer 17 includes an adhesive feeder 171, a tube 172, and a blower 173.

The tube 172 couples the housing 162 of the comminutor 16 to a housing 182 of the disperser 18. The tube 172 is a passage through which the mixture M7 of the fractionized substance M6 and the adhesive P1 passes.

The adhesive feeder 171 is coupled midway between the ends of the tube 172. The adhesive feeder 171 includes a screw feeder 174. When the screw feeder 174 is rotated, the adhesive P1 in powdered form or particle form is fed to the tube 172. The adhesive P1 fed to the tube 172 is mixed with the fractionized substance M6 to be a mixture M7.

The adhesive P1 is a bonding material that bonds the fibers in a subsequent step. Examples of the adhesive P include a thermoplastic resin, a curable resin, starch, dextrin, glycogen, amylose, hyaluronic acid, arrowroot, konjac starch, potato starch, etherified starch, esterified starch, natural gums, fiber derivative glue, seaweeds, and animal proteins. A thermoplastic resin is preferably employed. Examples of the thermoplastic resin include polyolefins such as AS resin, ABS resin, polyethylene, polypropylene, and ethylene-vinyl acetate copolymers, acrylic resins such as modified polyolefin, polymethyl methacrylate, polyesters such as polyvinyl chloride, polystyrene, polyethylene terephthalate, and polybutylene terephthalate, polyamides such as nylon 6, nylon 46, nylon 66, nylon 610, nylon 612, nylon 11, nylon 12, nylon 6-12, and nylon 6-66, liquid crystal polymers such as polyphenylene ether, polyacetal, polyether, polyphenylene oxide, polyether ether ketone, polycarbonate, polyphenylene sulfide, thermoplastic polyimide, polyether imide, and aromatic polyester, various thermoplastic elastomers such as a styrene-based elastomer, a polyolefin-based elastomer, a polyvinyl chloride-based elastomer, a polyurethane-based elastomer, a polyester-based elastomer, a polyamide-based elastomer, a polybutadiene-based elastomer, a trans polyisoprene-based elastomer, a fluorocarbon rubber-based elastomer, and a chlorinated polyethylene-based elastomer. They may be used alone or in combination. Preferably, the thermoplastic resin may be a polyester or may include a polyester.

The adhesive feeder 171 may feed, in addition to the adhesive P1, a colorant for coloring fibers, a coagulation inhibitor for preventing coagulation of fibers or coagulation of the adhesive P1, a flame retardant for making the fibers and other materials resistant to fire, a paper strength enhancer for enhancing the strength of a sheet S. Alternatively, the adhesive feeder 171 may feed a composite containing the above-described component and the adhesive P1.

On the tube 172, the blower 173 is disposed downstream of the adhesive feeder 171. The fractionized substance M6 and the adhesive P1 are mixed by action of a rotary portion of the blower 173 such as a blade. The blower 173 also generates an air stream flowing toward the disperser 18. The air stream stirs the fractionized substance M6 and the adhesive P1 in the tube 172. Thus, the mixture M7 flows into the disperser 18 with the fractionized substance M6 and the adhesive P1 being evenly dispersed. The fractionized substance M6 in the mixture M7 is untangled when passing through the tube 172 to be finer fibers.

The disperser 18 performs the untangling step of untangling the tangled fibers in the mixture M7. The disperser 18 includes a drum 181 and a housing 182 housing the drum 181.

The drum 181 has a meshed cylindrical body and is a sieve that rotates about the central axis thereof. The mixture M7 flows into the drum 181. When the drum 181 is rotated, elements such as fibers in the mixture M7 smaller than the sieve openings pass through the drum 181. The mixture M7 is untangled when passing through the drum 181.

The housing 182 is coupled to the humidifier 234. The humidifier 234 is a vapor humidifier as the humidifier 231. Thus, the humidified air is supplied into the housing 182. The humidified air humidifies the housing 182, reducing the possibility that the mixture M7 will be attached to the inner wall of the housing 182 by an electrostatic force.

The mixture M7 untangled in the drum 181 falls toward the second web forming unit 19 located below the drum 181 while being dispersed in the air. The second web forming unit 19 performs the second web forming step of forming the second web M8 from the mixture M7. The second web forming unit 19 includes a mesh belt 191, tension rollers 192, and a suctioning portion 193.

The mesh belt 191 is an endless belt on which the mixture M7 is accumulated. The mesh belt 191 is wound on the four tension rollers 192. When the tension rollers 192 are rotated, the mixture M7 on the mesh belt 191 is transported downstream.

Almost all the mixture M7 on the mesh belt 191 is larger than the mesh openings of the mesh belt 191. Thus, the mixture M7 does not pass through the mesh belt 191 and accumulates on the mesh belt 191. The mixture M7 accumulated on the mesh belt 191 is transported downstream together with the mesh belt 191, and thus the mixture forms a layered second web M8.

The suctioning portion 193 is a suctioning system for suctioning air from below the mesh belt 191. Thus, the mixture M7 is suctioned onto the mesh belt 191, accelerating accumulation of the mixture M7 on the mesh belt 191.

The suctioning portion 193 is coupled to a tube 246. Furthermore, the blower 263 is disposed on the tube 246. When the blower 263 is operated, a suctioning force is generated at the suctioning portion 193.

The humidifier 236 is disposed downstream of the disperser 18. The humidifier 236 is an ultrasonic humidifier as the humidifier 235. The moisture is supplied to the second web M8, and thus the moisture content of the second web M8 is adjusted. The adjustment reduces the possibility that the second web M8 will be attracted by an electrostatic force to the mesh belt 191. Thus, the second web M8 is readily detached from the mesh belt 191 at a position where the mesh belt 191 is turned by the tension roller 192.

The total amount of moisture added by the humidifiers 231 to 236 is preferably not less than 0.5 parts by mass and not more than 20 parts by mass per 100 parts by mass of the material before being humidified, for example.

The forming unit 20 is disposed downstream of the second web forming unit 19. The forming unit 20 performs the sheet forming step of forming the sheet S from the second web M8. The forming unit 20 includes a pressure portion 201 and a heating portion 202.

The pressure portion 201 includes two calendar rollers 203 and the second web M8 is pressurized between the calendar rollers 203 without being heated. This increases the density of the second web M8. When the second web M8 is heated, the heating is preferably performed so as not to melt the adhesive P1, for example. Then, the second web M8 is transported toward the heating portion 202. One of the two calendar rollers 203 is a driving roller that is powered by a motor (not illustrated) and the other is a driven roller.

The heating portion 202 includes two heating rollers 204 and the second web M8 is pressurized while being heated between the heating rollers 204. Furthermore, the heating portion 202 functions as a transportation portion that transports the second web M8 downstream. The adhesive P1 in the second web M8 is melted by the heat and pressure, and thus the fibers are bonded to each other by the melted adhesive P1. Thus, the sheet S is formed. The sheet S is then transported toward the cutting unit 21. One of the two heating rollers 204 is a driving roller that is powered by a motor (not illustrated) and the other is a driven roller.

The cutting unit 21 is disposed downstream of the forming unit 20. The cutting unit 21 performs the cutting step of cutting the sheet S. The cutting unit 21 includes a first cutting portion 211 and a second cutting portion 212.

The first cutting portion 211 cuts the sheet S in a direction intersecting the transportation direction of the sheet S, particularly in a direction perpendicular to the transportation direction of the sheet S.

The second cutting portion 212 is disposed downstream of the first cutting portion 211 and cuts the sheet S in a direction parallel to the transportation direction of the sheet S. In the cutting, the both ends of the sheet S or, as illustrated in FIG. 3, unnecessary portions at the ends in the +y axis direction and the −y axis direction are removed such that the sheet S has the uniform width. The portion cut off and removed is called a "scrap". Hereinafter, the portion cut off and removed is referred to as the sheet piece S1.

As illustrated in FIG. 3, the second cutting portion 212 includes a first cutting unit 213 that cuts a portion at the end in the +y axis direction of the sheet S and a second cutting unit 214 that cuts a portion at the end in the −y axis direction of the sheet S. The first cutting unit 213 is located away from the second cutting unit 214 in the +y axis direction. The first and second cutting units 213 and 214 have the same configuration, and the first cutting unit 213 is described below as a representative.

The first cutting unit 213 includes two rotary blades 215. The rotary blades 215 are arranged along the Z axis with the transportation route of the sheet S therebetween. The rotary blades 215 each have a disc-like shape and the thickness direction thereof corresponds to the y axis direction. The rotary blades 215 each have a sharp outer edge to cut the sheet S in the transportation direction when the sheet S is passing between the rotary blades 215.

The sheet piece S1 is formed by the second cutting portion 212 having the above-described configuration. Furthermore, as described later, the sheet piece S1 is fed into the coarse crusher 10 to be the coarsely crushed pieces M2. A sheet S having a desired shape and a desired size is transported further downstream to be on the storage 22.

The above-described components included in the fiber structure manufacturing apparatus 100 are electrically coupled to the controller 28. The operations of the components are controlled by the controller 28.

The controller 28 includes a central processing unit (CPU) 281 and memory 282. The CPU 281 is configured to make various decisions and execute various instructions, for example.

The memory 282 stores various programs such as a program for producing the sheets S.

The controller 28 may be installed in the fiber structure manufacturing apparatus 100 or mounted in an external device such as an external computer. The external device may be communicated with the fiber structure manufacturing apparatus 100 by cable or by radio or may be accessible by a network such as internet through the fiber structure manufacturing apparatus 100.

The CPU 281 and the memory 282 may be an integral one unit. Alternatively, the CPU 281 may be installed in the fiber structure manufacturing apparatus 100 and the memory 282 may be mounted in an external device such as an external computer. Alternatively, the memory 282 may be installed in the fiber structure manufacturing apparatus 100 and the CPU 281 may be mounted in an external device such as an external computer.

Next, the positional relationship of the components of the fiber structure manufacturing apparatus 100 is described. As illustrated in FIGS. 2 and 3, the fiber structure manufacturing apparatus 100 includes a housing 50 housing the above-described components. The housing 50 houses the coarse crusher 10, the defibrator 13, the sorter 14, the first web forming unit 15, the comminutor 16, the mixer 17, the disperser 18, the second web forming unit 19, the forming unit 20, and the cutting unit 21. The material feeder 11 is located outside the housing 50 and adjacent to the housing 50 in the +y axis direction. The storage 22 is located outside the housing 50 and adjacent to the housing 50 in the −x axis direction.

As illustrated in FIG. 2, the coarse crusher 10 located in the housing 50 is away from the center of the housing 50 in the +y axis direction and −x axis direction. The defibrator 13 is adjacent to the coarse crusher 10 in the −y axis direction. The sorter 14, the first web forming unit 15, and the comminutor 16 are adjacent to the defibrator 13 in the +x axis direction. The mixer 17 is adjacent to the sorter 14, the first web forming unit 15, and the comminutor 16 in the +x axis direction. The disperser 18 and the second web forming unit 19 are adjacent to the mixer 17 in the +y axis direction. The forming unit 20 is adjacent to the disperser 18 and the second web forming unit 19 in the −x axis direction. The cutting unit 21 is adjacent to the forming unit 20 in the −x axis direction. The sheet S that has been passed through the cutting unit 21 is transported in the −x axis direction and discharged to the outside of the housing 50 or to the storage 22.

Furthermore, as illustrated in FIG. 3, the cutting unit 21 is adjacent to the coarse crusher 10 in the +z axis direction. In this arrangement, the scrap or the sheet piece S1 cut by the second cutting unit 212 of the cutting unit 21 falls to the coarse crusher 10. Thus, the sheet piece S1 is coarsely crushed again together with the raw material M1, and the yield is improved.

Next, the coarse crusher 10 is described. As illustrated in FIGS. 3 to 6, the coarse crusher 10 includes a coarsely crushing unit 3 configured to crush the raw material M1 and the sheet piece S1, a hopper 4 configured to guide the raw material M1 and the sheet piece S1 to the coarsely crushing unit 3, and a gas ejector 5.

As illustrated in FIGS. 3 and 4, the coarsely crushing unit 3 includes two coarsely crushing blades 31 and a chute 32. The two coarsely crushing blades 31 rotate in opposite directions to coarsely crush or cut the raw material M1 and the sheet piece S1 therebetween to produce the coarsely crushed pieces M2. The two coarsely crushing blades 31 each have a cylindrical or hollow cylindrical shape extending in the x axis direction. The two coarsely crushing blades 31 are arranged in the y axis direction.

As illustrated in FIG. 9, the coarsely crushing blades 31 each include a shaft 311 and multiple blades 312 arranged coaxially with the shaft 311. The shaft 311 extends in the x axis direction. The blades 312 are arranged in the direction in which the shaft 311 extends or in the x axis direction. The blades 312 are tilted with respect to the y axis direction. Furthermore, the blades 312 of the adjacent coarsely crushing blades 31 partly overlap each other in the x axis direction. With this configuration, the raw material M1 or the sheet piece S1 is efficiently cut.

The coarsely crushed piece M2 preferably has a size and a shape suitable for the defibrating process performed by the defibrator 13. For example, the coarsely crushed piece M2 is preferably a small piece having a side length of not more than 100 mm, or more preferably a small piece having a side length of not less than 10 mm and not more than 70 mm.

As illustrated in FIG. 3, the chute 32 is adjacent to the coarsely crushing blades 31 in the −z axis direction. The chute 32 has a funnel-like shape. Thus, the chute 32 can receive the coarsely crushed piece M2. The tube 241 is coupled to the chute 32. The tube 241 couples the chute 32 and the defibrator 13 to each other. Thus, the coarsely crushed piece M2 is transported through the tube 241 to the defibrator 13.

As illustrated in FIGS. 3 to 5, the hopper 4 is a receiving member located above the coarsely crushing unit 3 in the vertical direction or adjacent to the coarsely crushing unit 3 in the +z axis direction. The hopper 4 includes two guide plates 41 and 42 and two coupling plates 43 and 44. The guide plate 41, the guide plate 42, the coupling plate 43, and the coupling plate 44 are joined to form an opening 4A opening in the +z axis direction and an opening 4B opening in the −z axis direction.

The opening 4A is an inlet through which the raw material M1 and the sheet piece S1 enters. The opening 4B is a feed opening through which the raw material M1 and the sheet piece S1 are discharged from the hopper 4 such that the raw material M1 and the sheet piece S1 are fed to the coarsely crushing unit 3.

The guide plates 41 and 42 face each other in the y axis direction with the opening 4B as the feed opening therebetween. The guide plate 41 is located on the +y axis side and the guide plate 42 is located on the −y axis side. The coupling plates 43 and 44 face each other in the x axis direction with the opening 4B therebetween. The coupling plate 43 is located on the +x axis side and the coupling plate 44 is located on the −x axis side.

The inner surfaces of the guide plates 41 and 42 and the coupling plates 43 and 44 are guide surfaces 440 that guide the falling raw material M1 and the falling sheet piece S1 to the coarsely crushing unit 3. The guide surfaces 440 include a first guide surface 411, a second guide surface 421, a third guide surface 431, and a fourth guide surface 441. The inner surface of the guide plate 41 is the first guide surface 411, the inner surface of the guide plate 42 is the second guide surface 421, the inner surface of the coupling plate 43 is the third guide surface 431, and the inner surface of the coupling plate 44 is the fourth guide surface 441. The falling raw material M1 and the falling sheet piece S1 come in contact with one of the first to fourth guide surfaces 411 to 441 and slide thereon to the opening 4B.

The guide plate 41 and the guide plate 42 are tilted in opposite directions. The guide plates 41 and 42 are tilted such that the distance therebetween gradually decreases in the −z axis direction. In other words, the first and second guide surfaces 411 and 421 are tilted such that the distance therebetween decreases in a vertical downward direction or in the −z axis direction. With this configuration, the raw material M1 and the sheet piece S1 falling to the hopper 4 are more effectively guided to the coarsely crushing unit 3.

As described above, the guide surface 440 has the first and second guide surfaces 411 and 421 located vertically above the coarsely crushing unit 3 and facing each other with the coarsely crushing unit 3 being located therebetween. The first and second guide surfaces 411 and 421 are tilted such that the distance therebetween decreases in the vertical downward direction. With this configuration, the raw material M1 and the sheet piece S1 falling to the hopper 4 are more effectively guided to the coarsely crushing unit 3.

As illustrated in FIG. 3, a guide plate 45 is disposed a predetermined distance away from the guide plate 42 in the +y axis direction. The raw material M1 is put into a space between the guide plate 42 and the guide plate 45 to be fed to the coarsely crushing unit 3 through the space therebetween.

Next, the gas ejector 5 is described. As illustrated in FIGS. 4 to 6, the gas ejector 5 includes an ejector body 52 having ejection ports 51 through which a gas is ejected, a feed tube 53, a blower 54, a humidifier 55, and a static eliminator 56.

The ejector body 52 includes an inner hole 520 and the external shape thereof is a block-like box shape elongated in the y axis direction. The ejector body 52 is adjacent to the hopper 4 in the +z axis direction and the −x axis direction. Specifically described, the ejector body 52 is adjacent to the coupling plate 44 in the +z axis direction. A wall 521 of the ejector body 52 facing in the +x axis direction or adjacent to the hopper 4 is tilted with respect to the y-z plane. The wall 521 is tilted to face the inside of the hopper 4 or to face the guide surface 440.

The wall 521 has the ejection ports 51. The ejection ports 51 are through holes extending through the wall 521 in the thickness direction. The inner hole 520 and the outside of the ejector body 52 are in communication with each other through the ejection ports 51. As described above, the wall 521 is tilted to face the guide surface 440, and thus a gas is ejected through the ejection ports 51 toward the guide surface 440.

As illustrated in FIG. 4, the ejector body 52 has twelve ejection ports 51 in total. Six of them are located near the end in the +y axis direction or near the first guide surface 411. Six of them are located near the end in the −y axis direction or near the second guide surface 421. The six ejection ports 51 near the first guide surface 411 are arranged in two rows of three ejection ports 51. The six ejection ports 51 near the second guide surface 421 are also arranged in two rows of three ejection ports 51.

As illustrated in FIG. 6, the blower 54 is coupled to the ejector body 52 via the feed tube 53. The feed tube 53 is coupled to an end in the −y axis direction of the ejector body 52. When the blower 54 is operated, a gas is fed into the inner hole 520 of the ejector body 52 through the feed tube 53, and the gas is ejected through the ejection ports 51. Furthermore, as illustrated in FIG. 6, the blower 54 is electrically coupled to the controller 28 and the operation thereof is controlled by the controller 28.

The raw material M1 and the sheet piece S1 are in the form of sheet, and thus, when the main surface of the falling raw material M1 or the falling sheet piece S1 is attached to the guide surface 440, it may stay there. In addition, the raw material M1 and the sheet piece S1 may be readily attached to the guide surface 440 depending on the charge amount, for example. When the raw material M1 or the sheet piece S1 is attached to the guide surface 440, multiple sheets of the raw material M1 or the sheet piece S1 may be fed to the coarsely crushing unit 3 at the same time. When the number of sheets is too many, the coarsely crushing unit 3 would be jammed with the raw material M1 or the sheet piece S1. Even if the jam is not caused, the quantitative properties are deteriorated.

To solve the problem, the coarse crusher 10 includes the gas ejector 5 configured to eject a gas through the ejection ports 51 toward the guide surface 440. With this configuration, the main surface of the falling raw material M1 or the falling sheet piece S1 about to be closely attached to the guide surface 440 is physically kept away from the guide surface 440 by air pressure. Thus, the raw material M1 and the sheet piece S1 are effectively guided to the coarsely crushing unit 3.

The gas ejector 5 also functions as an auxiliary posture adjuster. Specifically described, the gas ejector 5 ejects a gas to adjust the posture of the falling sheet piece S1. The posture of the falling sheet piece S1 is adjusted before the sheet piece S1 enters the opening 4B such that the sheet piece S1 in a desirable posture is fed to the coarsely crushing unit 3. In the desirable posture, the plane direction of the sheet piece S1 is tilted with respect to the direction in which the coarsely crushing blades 31 are arranged or the y axis direction. This will be described later.

If the thickness direction of the sheet piece S1 and the thickness direction of the blades 312 are the same, the sheet S1 passing between the two coarsely crushing blades 31 will not be sufficiently coarsely crushed. Thus, the coarsely crushed piece M2 may fail to have a desired size.

Furthermore, this configuration prevents or reduces attachment of the raw material M1 and the sheet piece S1 and thus has high quantitative properties. The coarse crusher 10 according to the present disclosure is suitable for manufacturing the sheets S and thus the sheets S having high quality is obtained.

As described above, the coarse crusher 10 includes the gas ejector 5, which functions as the auxiliary posture adjuster configured to adjust the posture of the sheet piece S1 before being coarsely crushed. With this configuration, the sheet piece S1 is adjusted to be in a desirable posture before being fed to the coarsely crushing unit 3, and thus the sheet piece S1 is more reliably coarsely crushed. Furthermore, the effects of the present disclosure are more remarkably obtained through the synergistic effect of the gas ejector 5 and the posture adjuster 6, which will be described later.

The auxiliary posture adjuster is disposed on the coupling plate 44, which is one of the coupling plates 43 and 44 that has a protrusion 61, and includes the gas ejector 5 configured to eject a gas into the hopper 4. With this configuration, the posture of the falling sheet piece S1 is readily and effectively adjusted by the air stream.

Furthermore, the raw material M1 and the sheet piece S1 containing a cellulose fiber is advantageous, because they are less likely to be charged when cut by the cutting unit 21 and are less likely to attach to the guide surface 440.

The sheet piece S1 as a material is a rectangular cut waste obtained by cutting off the edge of the sheet S being transported. As described above, during the cutting of the sheet S, the sheet S is cut under tension, and thus the sheet piece S1 curves and sags in the thickness direction. The main surface of the sheet piece S1 in such a shape is further less likely to be in close contact with the guide surface 440. This configuration more effectively prevents or reduces the attachment of the sheet piece S1 to the guide surface 440.

Furthermore, the raw material M1 and the sheet piece S1 are coarsely crushed by the same coarse crusher 10. This simplifies the structure of the fiber structure manufacturing apparatus 100.

As illustrated in FIG. 5, the ejection port 51 ejects a gas obliquely downward from vertically above. The ejection direction of the gas from the ejection port 51 has a vector component directed vertically downward from vertically above. This effectively accelerates the falling of the raw material M1 and the sheet piece S1. This configuration more effectively prevents or reduces the attachment of the raw material M1 and the sheet piece S1 to the guide surface 440.

As illustrated in FIG. 5, the sheet piece S1 is transported in a direction having a vector component in the −x axis direction while falling, because the sheet piece S1 is a cut piece of the sheet S transported in the −x axis direction. Contrary to this, the ejection port 51 ejects a gas obliquely downward from vertically above, and the ejection direction has a vector component in the +x axis direction. In other words, the ejection direction and the fall direction have vector components in opposite directions, i.e., counter directions.

As described above, the sheet piece S1 as a material falls into the coarsely crushing unit 3 while being transported in a direction intersecting the vertical direction, and the ejection direction in which a gas is ejected from the ejection port 51 is a direction having a vector component in a direction opposite to the transportation direction of the sheet piece S1 intersecting the vertical direction. With this configuration, the posture of the sheet piece S1 falling or sliding on the guide surface 440 is effectively changed. Thus, this configuration effectively prevents or reduces the attachment of the sheet piece S1 to the guide surface 440.

A gas is preferably intermittently ejected from the ejection port 51. In other words, the controller 28 preferably switches the power of the blower 54 on and off from time to time. The intermittent gas ejection uses less power than continuous gas ejection. Furthermore, this configuration effectively prevents or reduces stale air in the hopper 4. This effectively prevents or reduces the attachment of the raw material M1 and the sheet piece S1 to the guide surface 440.

The gas may be intermittently ejected by other methods than by switching the power of the blower 54 on and off from time to time. For example, a throttle valve may be disposed in each flow passage and the opening degree of the throttle valve may be adjusted.

The gas ejector 5 may continuously eject a gas. In such a case, the ejection volume may be varied, or the ejection direction may be changed from time to time, to have the above-described effect.

As illustrated in FIG. 6, the humidifier 55 is coupled to the feed tube 53 between the ejector body 52 and the blower 54. Thus, the gas from the ejection port 51 is humidified.

The humidifier 55 may be a vapor humidifier or an ultrasonic humidifier and preferably is an ultrasonic humidifier. In this configuration, an agent such as a moisturizer may be dissolved in a liquid in the humidifier 55. When the moisturizer is dissolved, a gas is ejected together with the moisturizer from the ejection port 51. Thus, the raw material M1 and the sheet piece S1 keep the sufficient moisture content. This effectively prevents the charge amount of the raw material M1 and the sheet piece S1 from excessively increasing when the raw material M1 and the sheet piece S1 slide on the guide surface 440.

As illustrated in FIG. 6, the static eliminator 56 is coupled to the feed tube 53 at a position between the ejector body 52 and the blower 54. The static eliminator 56 is an ionizer, for example. The static eliminator 56 emits ions to the feed tube 53 to neutralize static electricity on the raw material M1 and the sheet piece S1. This reduces the charge amount of the raw material M1 and the sheet piece S1. This configuration effectively prevents or reduces the attachment of the raw material M1 and the sheet piece S1 to the guide surface 440 caused by static electricity.

The static eliminator 56 is not limited to the above-described configuration. For example, the hopper 4 may be grounded.

As described above, the gas ejector 5 includes the static eliminator 56 that reduces the charge amount of the raw material M1 as a material and the sheet piece S1. Thus, the charge amount of the raw material M1 and the sheet piece S1 is reduced. This effectively prevents or reduces the attachment of the raw material M1 and the sheet piece S1 to the guide surface 440 caused by static electricity.

The guide surface 440 is preferably plated so as not to be charged. The guide surface 440 may be plated with any metal having relatively high conductivity such as nickel, copper, and gold. Among these metals, nickel is preferably employed. The nickel plating not only suppresses increase in the charge amount but also provides an antirust effect. The plating prevents or reduces rust of the hopper 4 even when relatively high-humidity air is ejected from the ejection port 51.

As described above, the sheet piece S1 is fed to the coarsely crushing unit 3 while being kept in a desirable posture and in a desirable orientation by the operation of the gas ejector 5. However, as illustrated in FIG. 11, the sheet piece S1 being coarsely crushed by the coarsely crushing unit 3 may get twisted and disorderly moved in the hopper 4 at a portion before being coarsely crushed. The sheet piece S1 being coarsely crushed in a desirable posture as illustrated in FIG. 7 may change the posture to an undesirable posture illustrated in FIG. 8 and FIG. 11. In the middle of the coarsely crushing, the thickness direction of the sheet piece S1 may be changed to correspond to the direction in which the coarsely crushing blades 31 are arranged (hereinafter, the posture may be simply referred to as an "undesirable posture"). The sheet piece S1 is easily twisted to be in an undesirable posture, because the blades 312 are tilted with respect to the y axis direction as illustrated in FIG. 9.

In view of the above, the posture adjuster 6 is provided in the present disclosure to solve the above-described problem. Hereinafter, this will be explained.

As illustrated in FIG. 4, the posture adjuster 6 includes the protrusion 61 disposed on the coupling plate 44 and protruding toward the inner side of the hopper 4. As illustrated in FIG. 10, the protrusion 61 is configured to come in contact with the sheet piece S1 being coarsely crushed by the coarsely crushing unit 3 to adjust the posture of a portion of the sheet piece S1 that is remote from the coarsely crushing unit 3.

The protrusion 61 has a width in the y axis direction gradually decreasing in the +x axis direction. In other words, the protrusion 61 has a top portion 611 at the end in the +x axis direction and two posture adjustment surfaces 612 titled with respect to each other with a distance therebetween decreasing in the +x axis direction. The posture adjustment surface 612 on the +y axis side faces the first guide surface 411 and the posture adjustment surface 612 on the −y axis side faces the second guide surface 421.

When the sheet piece S1 being coarsely crushed is about to get twisted as illustrated in FIG. 11, the posture adjuster 6 having the above-described configuration comes in contact with a portion of the sheet piece S1 that is remote from the coarsely crushing unit 3, as illustrated in FIG. 12. Thus, the sheet piece S1 is turned about the axis or twisted such that the posture of the sheet piece S1 is adjusted. Thus, the sheet piece S1 being coarsely crushed keeps the above-described desirable posture. This results in more reliable coarse crushing and improves the quantitative properties.

The protrusion 61 has the two posture adjustment surfaces 612 to be in contact with the sheet piece S1. With this configuration, the protrusion 61 more reliably comes in contact with the sheet piece S1, and thus the effect of the present disclosure is more remarkably obtained.

Figure 13:
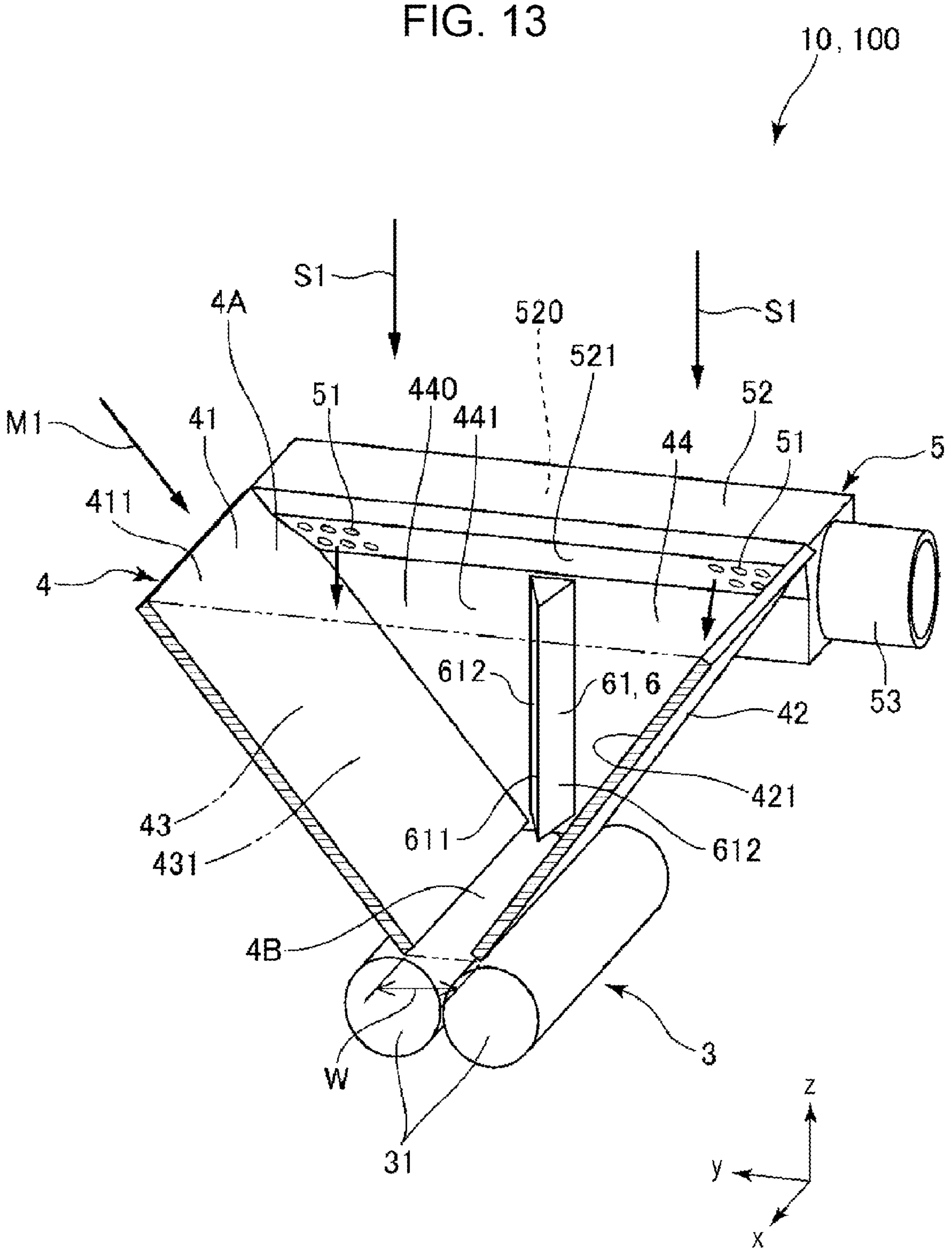
FIG. 13 is a perspective view of a hopper included in a coarse crusher according to a second embodiment.

As illustrated in FIG. 13, the protrusion 61 is tilted with respect to the line normal to the fourth guide surface 441, which is the inner surface of the coupling plate 44. With this configuration, the protrusion 61 more reliably comes in contact with the sheet piece S1, and thus the effect of the present disclosure is more remarkably obtained.

In this embodiment, the protrusion 61 is located close to the opening 4B, which is a feed opening. With this configuration, the protrusion 61 more reliably comes in contact with the sheet piece S1 regardless of the length of the sheet piece S1. When the sheet piece S1 is about to get twisted, the portion of the sheet piece S1 remote from the coarsely crushing unit 3 is likely to be positioned at a vertical lower side in the hopper 4 as illustrated in FIG. 12. Thus, the above-described location of the protrusion 61 is advantageous.

The sheet piece S1 is a cut piece of the sheet S transported in the direction in which the coupling plates 43 and 44 face each other. The protrusion 61 is disposed on the coupling plate 44, which is one of the coupling plates 43 and 44 that is located downstream in the direction in which the sheet piece S1 is transported. In the hopper 4, the sheet piece S1 is likely to come in contact with the coupling plate 44 that is located downstream in the transportation direction of the sheet S. Thus, the protrusion 61 located at the above-described position more reliably comes in contact with the sheet piece S1, and thus the effect of the present disclosure is more remarkably obtained.

As described above, the coarse crusher 10 includes the coarsely crushing unit 3 configured to coarsely crush the sheet piece S1 having an elongated shape, the hopper 4 having the opening 4B as a feed opening through which the sheet piece S1 is fed to the coarsely crushing unit 3, the hopper 4 being configured to feed the sheet piece S1 putted into the hopper 4 to the coarsely crushing unit 3 through the opening 4B, and the posture adjuster 6 configured to adjust the posture of the sheet piece S1. The hopper 4 includes the two guide plates 41 and 42 facing each other with the opening 4B therebetween and configured to guide the sheet piece S1 to the coarsely crushing unit 3 and the two coupling plates 43 and 44 coupling the two guide plates 41 and 42 to each other. The posture adjuster 6 includes the protrusion 61 disposed on the coupling plate 44 and protruding toward the inner side of the hopper 4. The posture adjuster 6 is configured to come in contact with the sheet piece S1 being coarsely crushed by the coarsely crushing unit 3 to adjust the posture of a portion of the sheet piece S1 that is remote from the coarsely crushing unit 3. With this configuration, when the sheet piece S1 being coarsely crushed is about to get twisted as illustrated in FIG. 11, the posture adjuster 6 comes in contact with a portion of the sheet piece S1 that is remote from the coarsely crushing unit 3 to turn the sheet piece S1 about the axis or to twist such that the posture of the sheet piece S1 is adjusted, as illustrated in FIG. 12. Thus, the sheet piece S1 being coarsely crushed keeps the above-described desirable posture. This results in more reliable coarse crushing and improves the quantitative properties.

Furthermore, as described above, the coarsely crushing unit 3 includes two coarsely crushing blades 31 configured to rotate about the shafts extending in a direction in which the two coupling plates 43 and 44 face each other. When the sheet piece S1 is in an undesirable posture, the coarsely crushing unit 3 having such a configuration does not properly coarsely crush the sheet piece S1. Thus, when the coarsely crushing unit 3 has this configuration, the effect of the present disclosure is more remarkably obtained.

The opening 4B as the feed opening has a dimension in a direction in which the guide plate 41 and the guide plate 42 face each other larger than a width of the sheet piece S1. This configuration enables the sheet piece S1 in an undesirable posture to be fed to the coarsely crushing unit 3. The present disclosure in which the posture adjuster 6 corrects the undesirable posture of the sheet piece S1 to a desirable posture is more effective when the opening 4B has this configuration.

The aspect ratio of the sheet piece S1 or the ratio L/W of the length L to the width W in plan view is not limited but may be not less than 1.5 and not more than 50, for example. The length L is not limited but may be not less than 200 mm and not more than 500 mm, for example. The width W is not limited but may be not less than 1 mm and not more than 70 mm, for example.

When the length L is 370 mm or more, the sheet piece S1 being coarsely crushed is likely to be drawn to the coupling plate 44 at the portion that is remote from the coarsely crushing unit 3, and thus the effect of the present disclosure is more remarkably obtained.

The gas ejector 5 may be eliminated. The elimination of the gas ejector 5 slightly increases the possibility that the sheet piece S1 will be in an undesirable posture. Thus, when the ratio L/W is not less than 2.0 and not more than 30, the effect of the present disclosure is more remarkably obtained.

A grammage of the constituent material of the sheet piece S1 is preferably not less than 120 $g/m^2$ and not more than 300 $g/m^2$ and is more preferably not less than 150 $g/m^2$ and not more than 200 $g/m^2$. The sheet piece S1 having the grammage in the above-described range is firm and thus, when the sheet piece S1 is in an undesirable posture, the sheet piece S1 is highly likely to pass between the coarsely crushing blades 31 without being coarsely crushed. Thus, the present disclosure is more effective.

The shape of the protrusion 61 is not limited to the shape in the drawings and may be a bar-like shape such as a rectangular prism shape and a cylindrical shape.

In this embodiment, the protrusion 61 is disposed only on the coupling plate 44. However, the present disclosure is not limited to this. The protrusion 61 may be disposed only on the coupling plate 43 or may be disposed on both of the coupling plate 43 and the coupling plate 44.

In this embodiment, the gas ejector 5 is disposed on an upper section of the coupling plate 44. However, the present disclosure is not limited to this. The gas ejector 5 may be disposed on the guide plate 41 or 42 or the coupling plate 43 or 44 or may be disposed on two or more of them.

The protrusion 61 may be integrally formed with the coupling plate 44 or may be a separate component.

Second Embodiment

FIG. 13 is a perspective view of a hopper included in a coarse crusher according to a second embodiment.

Hereinafter, the coarse crusher according to the second embodiment of the present disclosure will be described with reference to the drawings. Differences between the above-described embodiment and the second embodiment will be mainly described, and the same points will not be described.

As illustrated in FIG. 13, in this embodiment, a protrusion 61 has an elongated shape extending in the z axis direction. The protrusion 61 may extend over the entire length of the coupling plate 44 in the z axis direction or may be shorter than the entire length. Two posture adjustment surfaces 612 both extend in the z axis direction.

As described above, the protrusion 61 extends in the depth direction of the hopper 4. When the sheet piece S1 is being coarsely crushed, the portion of the sheet piece S1 that is remote from the coarsely crushing unit 3 may be positioned at the upper section of the hopper 4. In such a case, the posture of the portion is adjusted by the protrusion 61. This results in more reliable coarse crushing and improves the quantitative properties.

Third Embodiment

Figure 14:
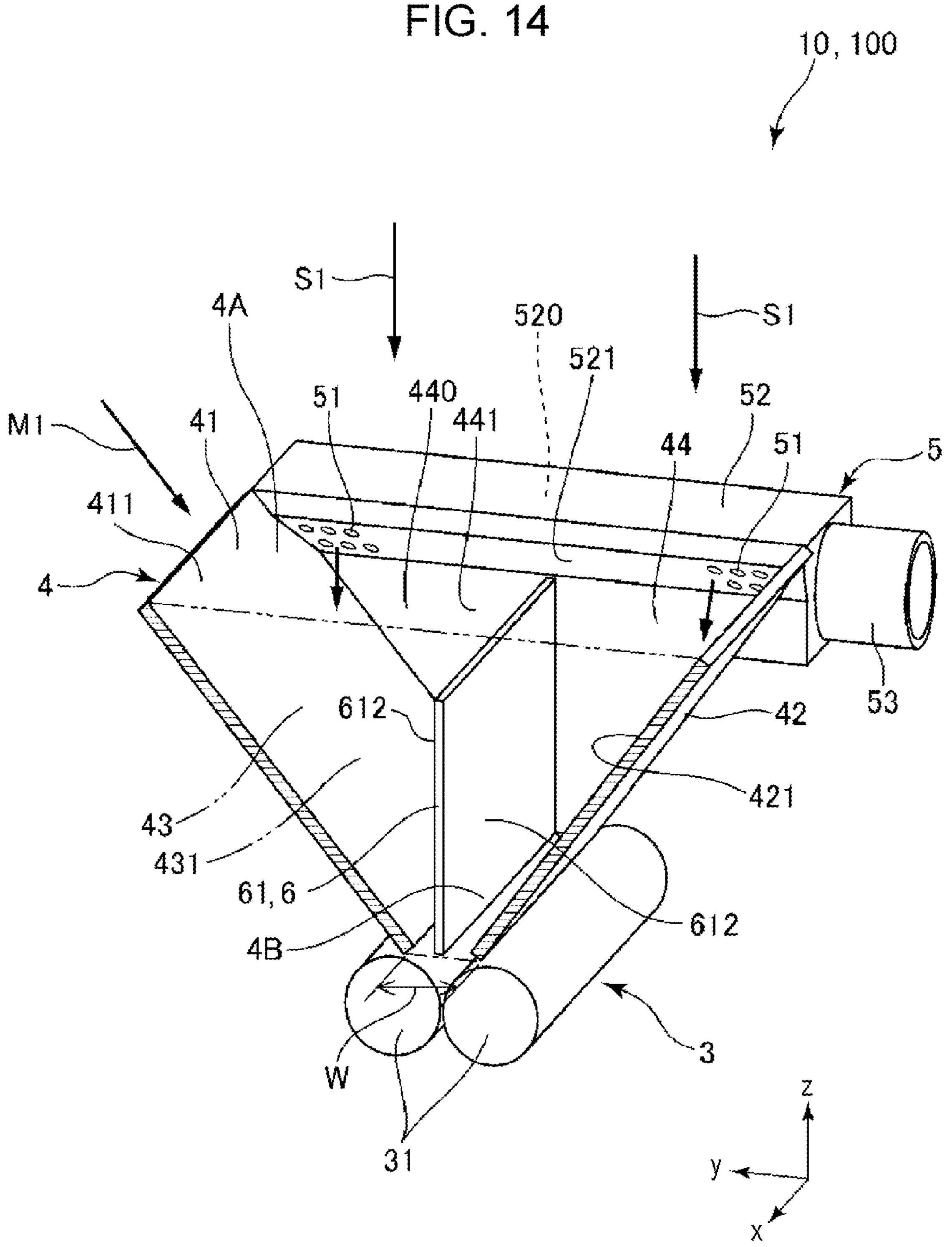
FIG. 14 is a perspective view of a hopper included in a coarse crusher according to a third embodiment.

FIG. 14 is a perspective view of a hopper included in a coarse crusher according to a third embodiment.

Hereinafter, the coarse crusher according to the third embodiment of the present disclosure will be described with reference to the drawings. Differences between the above-described embodiment and the third embodiment will be mainly described, and the same points will not be described.

As illustrated in FIG. 14, in this embodiment, a protrusion 61 has a plate-like shape and protrudes to the inner side of the hopper 4. The protrusion 61 is arranged such that the thickness direction corresponds to the y axis direction or the plane direction corresponds to the x-z plane. The protrusion 61 partitions the hopper 4 in the y axis direction.

The coarse crusher according to the present disclosure has been described above using the embodiments illustrated in the drawings. However, the present disclosure is not limited to the above and the components of the coarse crusher may be replaced with any component that achieves the similar function to the corresponding component. Furthermore, the coarse crusher may include any additional component.

The coarse crusher according to the present disclosure may have any two or more configurations in the above-described embodiments.

What is claimed is:

1. A coarse crusher comprising:

a coarsely crushing unit configured to coarsely crush a sheet piece having an elongated shape;

a hopper having a feed opening through which the sheet piece is fed to the coarsely crushing unit, the hopper being configured to feed the sheet piece putted into the hopper to the coarsely crushing unit through the feed opening; and a posture adjuster configured to adjust posture of the sheet piece, wherein the hopper includes two guide plates facing each other with the feed opening therebetween and configured to guide the sheet piece to the coarsely crushing unit and two coupling plates coupling the two guide plates to each other, and the posture adjuster includes a protrusion disposed on at least one of the coupling plates and protruding toward an inner side of the hopper, the posture adjuster being configured to come in contact with the sheet piece being coarsely crushed by the coarsely crushing unit to adjust the posture of a portion of the sheet piece that is remote from the coarsely crushing unit.

2. The coarse crusher according to claim 1, wherein the protrusion has two posture adjustment surfaces to be in contact with the sheet piece.

3. The coarse crusher according to claim 2, wherein the protrusion is tilted with respect to a line normal to an inner surface of one of the coupling plates that has the protrusion.

4. The coarse crusher according to claim 1, wherein the protrusion is located close to the feed opening.

5. The coarse crusher according to claim 1, wherein the protrusion extends in a depth direction of the hopper.

6. The coarse crusher according to claim 1, wherein the sheet piece is a cut piece of a sheet transported in a direction in which the two coupling plates face each other, and the protrusion is disposed on one of the coupling plates that is located downstream in the direction in which the sheet is transported.

7. The coarse crusher according to claim 1, further comprising an auxiliary posture adjuster configured to adjust the posture of the sheet piece before being coarsely crushed.

8. The coarse crusher according to claim 7, wherein the auxiliary posture adjuster is disposed on one of the two coupling plates that has the protrusion and includes a gas ejector configured to eject a gas into the hopper.

9. The coarse crusher according to claim 1, wherein the feed opening has a dimension in a direction in which the two guide plates face each other larger than a width of the sheet piece.

10. The coarse crusher according to claim 1, wherein the coarsely crushing unit includes two coarsely crushing blades configured to rotate about shafts extending in a direction in which the two coupling plates face each other.

* * * * *